United States Patent
Reial et al.

(10) Patent No.: US 11,324,009 B2
(45) Date of Patent: May 3, 2022

(54) EFFICIENT CORESET CONFIGURATION

(71) Applicant: Telefonaktiebolaget LM Ericsson (publ), Stockholm (SE)

(72) Inventors: Andres Reial, Malmö (SE); Pål Frenger, Linköping (SE); Asbjörn Grövlen, Stockholm (SE); Jingya Li, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 185 days.

(21) Appl. No.: 16/759,117

(22) PCT Filed: Nov. 16, 2018

(86) PCT No.: PCT/EP2018/081561
§ 371 (c)(1),
(2) Date: Apr. 24, 2020

(87) PCT Pub. No.: WO2019/096994
PCT Pub. Date: May 23, 2019

(65) Prior Publication Data
US 2021/0185683 A1 Jun. 17, 2021

Related U.S. Application Data

(60) Provisional application No. 62/587,866, filed on Nov. 17, 2017.

(51) Int. Cl.
*H04L 5/00* (2006.01)
*H04W 72/12* (2009.01)
(Continued)

(52) U.S. Cl.
CPC ..... *H04W 72/0493* (2013.01); *H04W 68/005* (2013.01); *H04W 72/042* (2013.01);
(Continued)

(58) Field of Classification Search
CPC .......... H04W 72/0493; H04W 72/042; H04W 72/0446; H04W 72/0453; H04W 72/1289; H04W 68/005
See application file for complete search history.

(56) References Cited

U.S. PATENT DOCUMENTS

2019/0110277 A1* 4/2019 Bhattad ................ H04L 5/0091
2020/0021474 A1* 1/2020 Papasakellariou ... H04B 7/0456
2021/0099979 A1* 4/2021 Takeda .................. H04W 52/02

FOREIGN PATENT DOCUMENTS

EP    3706487 A1 *  9/2020  ............. H04L 5/001

OTHER PUBLICATIONS

Ericsson , "Remaining Details on RACH Procedure", 3GPP TSG RAN WG1 Meeting #91, Reno, Nevada, Dec. 27, 2017, pp. 1-24, R1-1720941, 3GPP.
(Continued)

*Primary Examiner* — Melvin C Marcelo
(74) *Attorney, Agent, or Firm* — Coats & Bennett, PLLC

(57) ABSTRACT

A network node determines a first transmission parameter for transmission of downlink control channel scheduling the downlink control information provided to a wireless device in a first signal, and selects either the first transmission parameter or one or more different second transmission parameters for transmission of the downlink control channel scheduling for the downlink control information provided to the wireless device in one or more second signals. To allow flexibility and efficient use of resources, the first signal sent by the base station indicates the one or more second transmission parameters as well as the selected transmission parameter(s) for the second signals. In one exemplary embodiment, the first and second transmission parameters comprise first and second control resource set (CORESET) configurations. In another exemplary embodiment, the first and second transmission parameters comprise first and second search spaces.

29 Claims, 14 Drawing Sheets

(51) Int. Cl.
*H04W 72/04* (2009.01)
*H04W 68/00* (2009.01)

(52) U.S. Cl.
CPC ... *H04W 72/0446* (2013.01); *H04W 72/0453* (2013.01); *H04W 72/1289* (2013.01)

(56) References Cited

OTHER PUBLICATIONS

Ericsson, "Remaining Details on Paging Design", 3GPP TSG RAN WG1 Meeting #91, Reno, Nevada, Dec. 27, 2017, pp. 1-9, R1-1720939, 3GPP.

ZTE, "OSI delivery", 3GPP TSG RAN WG1 Meeting #90bis, Prague, Czech Republic, Oct. 9, 2017, pp. 1-7, R1-1717033, 3GPP.

Ericsson, "Other system information delivery", 3GPP TSG RAN WG1 Meeting #90bis, Prague, Czech Republic, Oct. 9, 2017, pp. 1-4, R1-1718713, 3GPP.

Huawei et al., "RMSI delivery", 3GPP TSG RAN WG1 Meeting 90bis, Prague, Czech Republic, Oct. 9, 2017, pp. 1-6, R1-1717050, 3GPP.

Ericsson, "Additional synchronization provision", 3GPP TSG RAN WG1 Meeting #90bis, Prague, Czech Republic, Oct. 9, 2017, pp. 1-12, R1-1717761, 3GPP.

Qualcomm, "Summary of Remaining Details on RACH Procedure", 3GPP TSG RAN WG1 Meeting #90bis, Prague, Czech Republic, Oct. 9, 2017, pp. 1-29, R1-1719197, 3GPP.

Ericsson, "Response-driven paging to reduce beam sweeping overhead in NR", 3GPP TSG-RAN WG2 Ad Hoc on NR#2, Qingdao, China, Jun. 27, 2017, pp. 1-3, Tdoc R2-1706638, 3GPP.

Huang et al., "LS on NR Paging Mechanisms", 3GPP TSG RAN WG1 Meeting #90bis, Prague, Czech Republic, Oct. 9, 2017, p. 1, R1-1719164, 3GPP.

Ericsson, "MAC RAR PDU Design", 3GPP TSG-RAN WG2 #99, Berlin, Germany, Aug. 21, 2017, pp. 1-4, Tdoc R2-1708193, 3GPP.

Ericsson, "4-step random access procedure", 3GPP TSG-RAN WG1 NR Ad-Hoc#2, Qingdao, China, Jun. 27, 2017, pp. 1-18, R1-1711383, 3GPP.

Qualcomm Incorporated, "Paging design consideration", 3GPP TSG-RAN WG1 #88bis, Spoakne, USA, Apr. 3, 2017, pp. 1-8, R1-1705570, 3GPP.

* cited by examiner

Physical Channels

Content of Messages

```
MIB:
CoresetConfig1
...
```

```
SIB1:
CoresetConfig2 – optional
PagingConfiguration {
            CoreSetSelection = enum(1,2)
            ...
}
OsiConfiguration {
            CoreSetSelection = enum(1,2)
            ...
}
RarConfiguration {
            CoreSetSelection = enum(1,2)
            ...
}
functionXConfiguration {
            CoreSetSelection = enum(1,2)
            ...
}
...
```

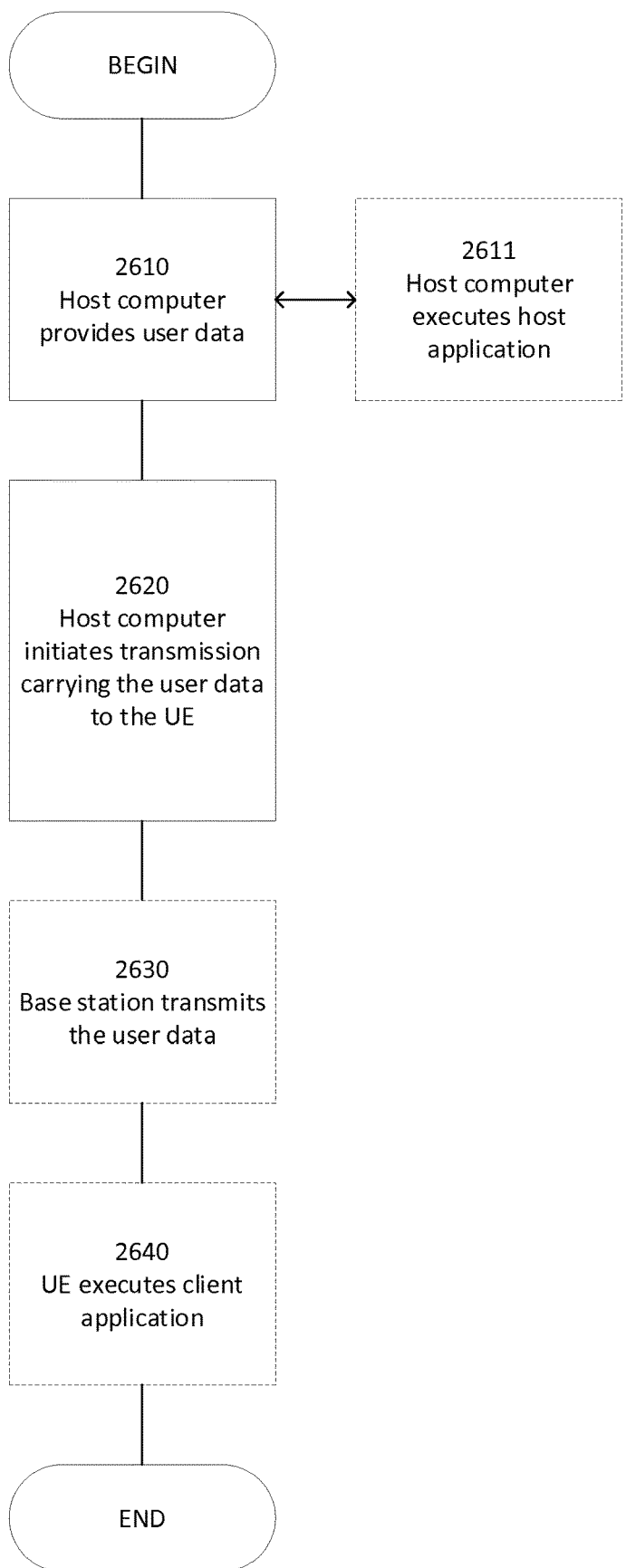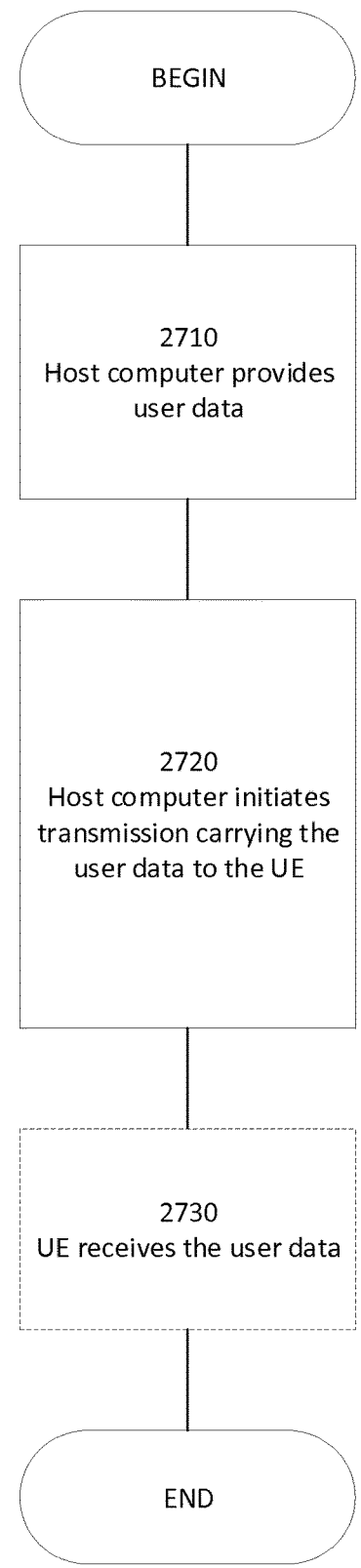
FIGURE 15
FIGURE 16

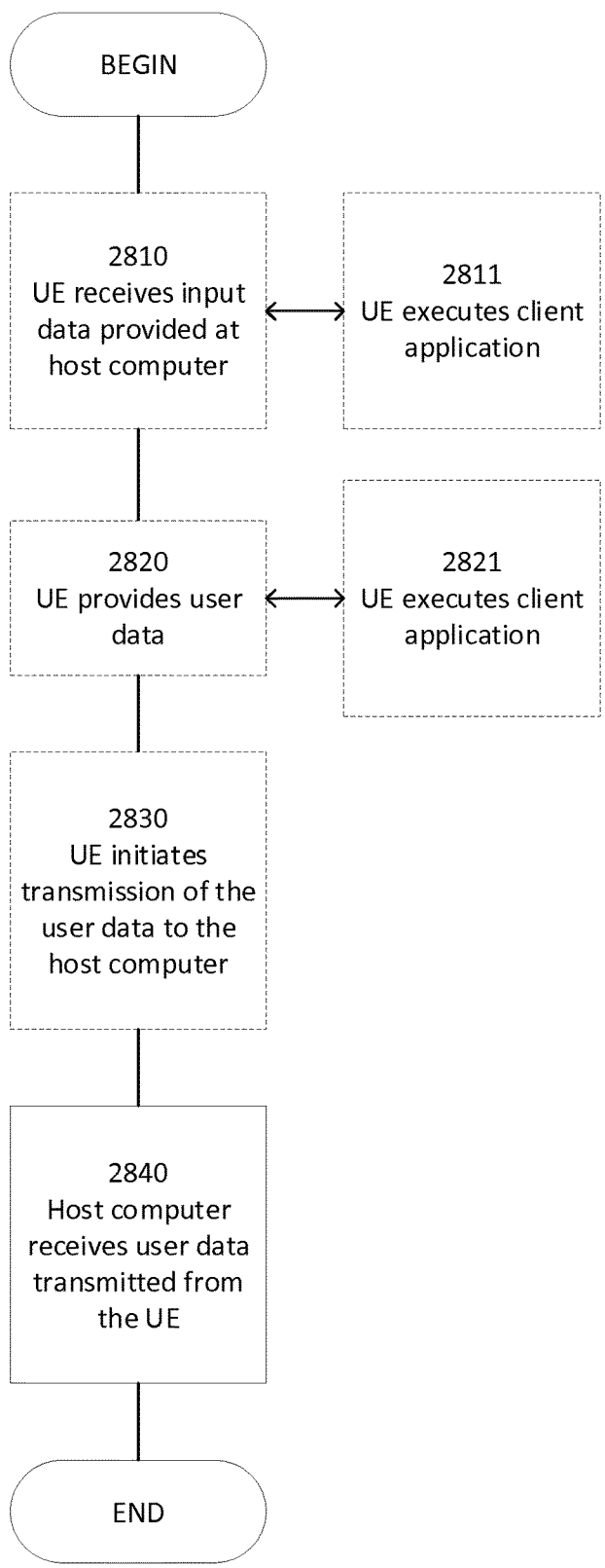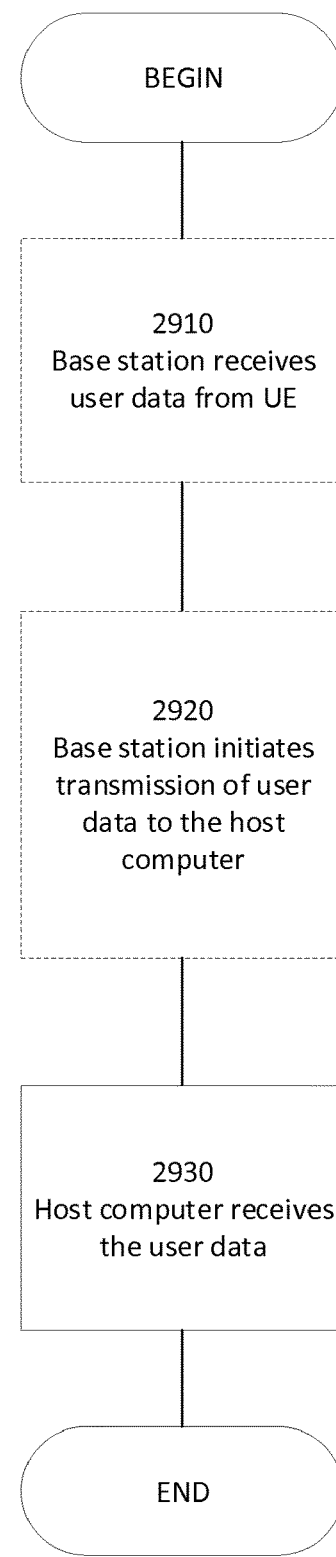
FIGURE 17
FIGURE 18

EFFICIENT CORESET CONFIGURATION

TECHNICAL FIELD

The solution presented herein generally relates to control channel transmissions, and more particularly relates to search space configurations for such control channel transmissions.

BACKGROUND

In wireless communication systems, a base station provides control signaling to one or more wireless devices to identify/allocate resources available for communications between the base station and the wireless device. In some systems, the base station provides such control information in defined/scheduled downlink control channels. For example, in New Radio (NR), the base station may configure a search space and/or a control resource set (CORESET) that define time and frequency resources for downlink control information included in signaling from the base station. The wireless devices then monitor the configured search spaces and/or CORESETs for signals to be received from the base station.

In a baseline, the base station sets the same CORESET configuration for all types of downlink control information, e.g., Remaining Minimum System Information (RMSI), paging information, Other System Information (OSI), and/or Random Access Response (RAR) information. However, doing so imposes significant constraints in systems with special System Information (SI) and/or paging coverage requirements. Further, requiring additional CORESET configurations for some types of downlink control information, e.g., RAR information, that may or may not be separate and different from the CORESET configuration for, e.g., the RMSI, wastes broadcasts resources. Thus, there remains a need for improved search space and/or CORESET configurations

SUMMARY

The solution presented herein determines a first transmission parameter for monitoring downlink control channel scheduling for downlink control information provided to a wireless device in a first signal and selects either the first transmission parameter or one or more different second transmission parameters for monitoring downlink control channel scheduling for downlink control information provided to the wireless device in one or more second signals. To allow flexibility and efficient use of resources, the first signal sent by the base station indicates the one or more second transmission parameters as well as the selected transmission parameter(s) for the second signals. In one exemplary embodiment, the first transmission parameter comprises a first control resource set (CORESET) configuration, and at least one of the second transmission parameter(s) comprises a second CORESET configuration. In another exemplary embodiment, the first transmission parameter comprises a first search space configuration, and at least one of the second transmission parameter(s) comprises a second search space configuration. As used herein, a CORESET is associated with a search space, and vice versa.

One exemplary embodiment comprises a method performed by a wireless device for receiving signals transmitted to the wireless device by a network node. The method comprises receiving a first signal using at least one receiver configured according to a first transmission parameter defining first time and/or frequency resources for monitoring downlink control channel scheduling for downlink control information included in the first signal. The first signal comprises one or more second transmission parameters and a configuration indication. The one or more second transmission parameters, which are each different from the first transmission parameter, each define different second time and/or frequency resources for monitoring downlink control channel scheduling for the downlink control information included in one or more second signals. The configuration indication indicates a selection, by the network node, of the first transmission parameter or the one or more second transmission parameters for each of the one or more second signals. The method further comprises configuring at least one receiver in the wireless device for receiving each of the one or more second signals according to the first transmission parameter or the one or more second transmission parameters responsive to the configuration indication, and receiving the one or more second signals using the at least one receiver configured responsive to the configuration indication.

One exemplary embodiment comprises a wireless device configured to receive signals from a network node. The wireless device comprises one or more processing circuits configured to receive a first signal using at least one receiver configured according to a first transmission parameter defining first time and/or frequency resources for monitoring downlink control channel scheduling for downlink control information included in the first signal. The first signal comprises one or more second transmission parameters and a configuration indication. The one or more second transmission parameters, which are each different from the first transmission parameter, each define different second time and/or frequency resources for monitoring downlink control channel scheduling for the downlink control information included in one or more second signals. The configuration indication indicates a selection, by the network node, of the first transmission parameter or the one or more second transmission parameters for each of the one or more second signals. The one or more processing circuits are further configured to configure at least one receiver in the wireless device for receiving each of the one or more second signals according to the first transmission parameter or the one or more second transmission parameters responsive to the configuration indication, and to receive the one or more second signals using the at least one receiver configured responsive to the configuration indication.

One exemplary embodiment comprises a wireless device configured to receive signals from a network node. The wireless device comprises a receiver unit/circuit/module and a configuration unit/circuit/module. The receiver unit/circuit/module is configured to receive a first signal according to a first transmission parameter defining first time and/or frequency resources for monitoring downlink control channel scheduling for downlink control information included in the first signal. The first signal comprises one or more second transmission parameters and a configuration indication. The one or more second transmission parameters, which are each different from the first transmission parameter, each define different second time and/or frequency resources for monitoring downlink control channel scheduling for the downlink control information included in one or more second signals. The configuration indication indicates a selection, by the network node, of the first transmission parameter or the one or more second transmission parameters for each of the one or more second signals. The configuration unit/circuit/module is configured to configure at least one receiver in the wireless device for receiving each of the one or more second signals according to the first transmission parameter or the one or more second transmission parameters responsive to the configuration indication. The receiver unit/circuit/module, as configured responsive to the configuration indication, receives the one or more second signals. In some embodiments, the wireless device includes an optional extraction unit/circuit/module configured to extract the one or more second transmission parameters and the configuration indication from the first signal.

One embodiment comprises a computer program product for controlling a wireless device. The computer program product comprises software instructions which, when run on processing circuitry in the wireless device, cause the wireless device to receive a first signal using at least one receiver configured according to a first transmission parameter defining first time and/or frequency resources for monitoring downlink control channel scheduling for downlink control information included in the first signal. The first signal comprises one or more second transmission parameters and a configuration indication. The one or more second transmission parameters, which are each different from the first transmission parameter, each define different second time and/or frequency resources for monitoring downlink control channel scheduling for the downlink control information included in one or more second signals. The configuration indication indicates a selection, by the network node, of the first transmission parameter or the one or more second transmission parameters for each of the one or more second signals. The software instructions, when run on the processing circuitry, further cause the wireless device to configure at least one receiver in the wireless device for receiving each of the one or more second signals according to the first transmission parameter or the one or more second transmission parameters responsive to the configuration indication, and to receive the one or more second signals using the at least one receiver configured responsive to the configuration indication. In one exemplary embodiment, a computer-readable medium comprises the computer program product. In one exemplary embodiment, the computer-readable medium comprises a non-transitory computer readable medium.

One exemplary embodiment comprises a method performed by a network node for signal transmission to a wireless device. The method comprises determining a first transmission parameter defining first time and/or frequency resources for transmission of downlink control channel scheduling the downlink control information in a first signal. The method further comprises selecting, for each of one or more second signals, the first transmission parameter or one or more second transmission parameters, each different from the first transmission parameter. The one or more second transmission parameters define different second time and/or frequency resources for transmission of the downlink control channel scheduling the downlink control information in the one or more second signals. The method further comprises transmitting the first signal to the wireless device according to the first transmission parameter. The first signal comprises the one or more second transmission parameters and a configuration indication indicating the selected transmission parameter for each of the one or more second signals. The method further comprises transmitting the one or more second signals to the wireless device according to the corresponding selected transmission parameter.

One exemplary embodiment comprises a network node configured to transmit signals to a wireless device. The network node comprises one or more processing circuits configured to determine a first transmission parameter defining first time and/or frequency resources for transmission of downlink control channel scheduling the downlink control information in a first signal. The one or more processing circuits are further configured to select, for each of one or more second signals, the first transmission parameter or one or more second transmission parameters, each different from the first transmission parameter. The one or more second transmission parameters define different second time and/or frequency resources for transmission of the downlink control channel scheduling the downlink control information in the one or more second signals. The one or more processing circuits are further configured to transmit the first signal to the wireless device according to the first transmission parameter. The first signal comprises the one or more second transmission parameters and a configuration indication indicating the selected transmission parameter for each of the one or more second signals. The one or more processing circuits are further configured to transmit the one or more second signals to the wireless device according to the corresponding selected transmission parameter.

One exemplary embodiment comprises a network node configured to transmit signals to a wireless device. The network node comprises a configuration unit/circuit/module, a selection unit/circuit/module, and a transmission unit/circuit/module. The configuration unit/circuit/module is configured to determine a first transmission parameter defining first time and/or frequency resources for transmission of downlink control channel scheduling the downlink control information in a first signal. The selection unit/circuit/module is configured to select, for each of one or more second signals, the first transmission parameter or one or more second transmission parameters, each different from the first transmission parameter. The one or more second transmission parameters define different second time and/or frequency resources for transmission of the downlink control channel scheduling the downlink control information in the one or more second signals. The transmission unit/circuit/module is configured to transmit the first signal to the wireless device according to the first transmission parameter. The first signal comprises the one or more second transmission parameters and a configuration indication indicating the selected transmission parameter for each of the one or more second signals. The transmission unit/circuit/module is further configured to transmit the one or more second signals to the wireless device according to the corresponding selected transmission parameter.

One exemplary embodiment comprises a computer program product for controlling a network node configured to transmit signals to a wireless device. The computer program product comprises software instructions which, when run on processing circuitry in the network node, causes the network node to determine a first transmission parameter defining first time and/or frequency resources for transmission of downlink control channel scheduling the downlink control information in a first signal. The software instructions, when run on the processing circuitry, further cause the network node to select, for each of one or more second signals, the first transmission parameter or one or more second transmission parameters, each different from the first transmission parameter. The one or more second transmission parameters define different second time and/or frequency resources for transmission of the downlink control channel scheduling the downlink control information in the one or more second signals. The software instructions, when run on the processing circuitry, further cause the network node to transmit the first signal to the wireless device according to the first transmission parameter. The first signal comprises the one or more second transmission parameters and a configuration indication indicating the selected transmission parameter for each of the one or more second signals. The software instructions, when run on the processing circuitry, further cause the network node to transmit the one or more second signals to the wireless device according to the corresponding selected transmission parameter. In one exemplary embodiment, a computer-readable medium comprises the computer program product. In one exemplary embodiment, the computer-readable medium comprises a non-transitory computer readable medium.

BRIEF DESCRIPTION OF THE DRAWINGS

FIG. 15 shows an exemplary method implemented in a communication system in accordance with embodiments of the solution presented herein.

FIG. 16 shows another exemplary method implemented in a communication system in accordance with embodiments of the solution presented herein.

FIG. 17 shows another exemplary method implemented in a communication system in accordance with embodiments of the solution presented herein.

FIG. 18 shows another exemplary method implemented in a communication system in accordance with embodiments of the solution presented herein.

DETAILED DESCRIPTION

Figure 1:
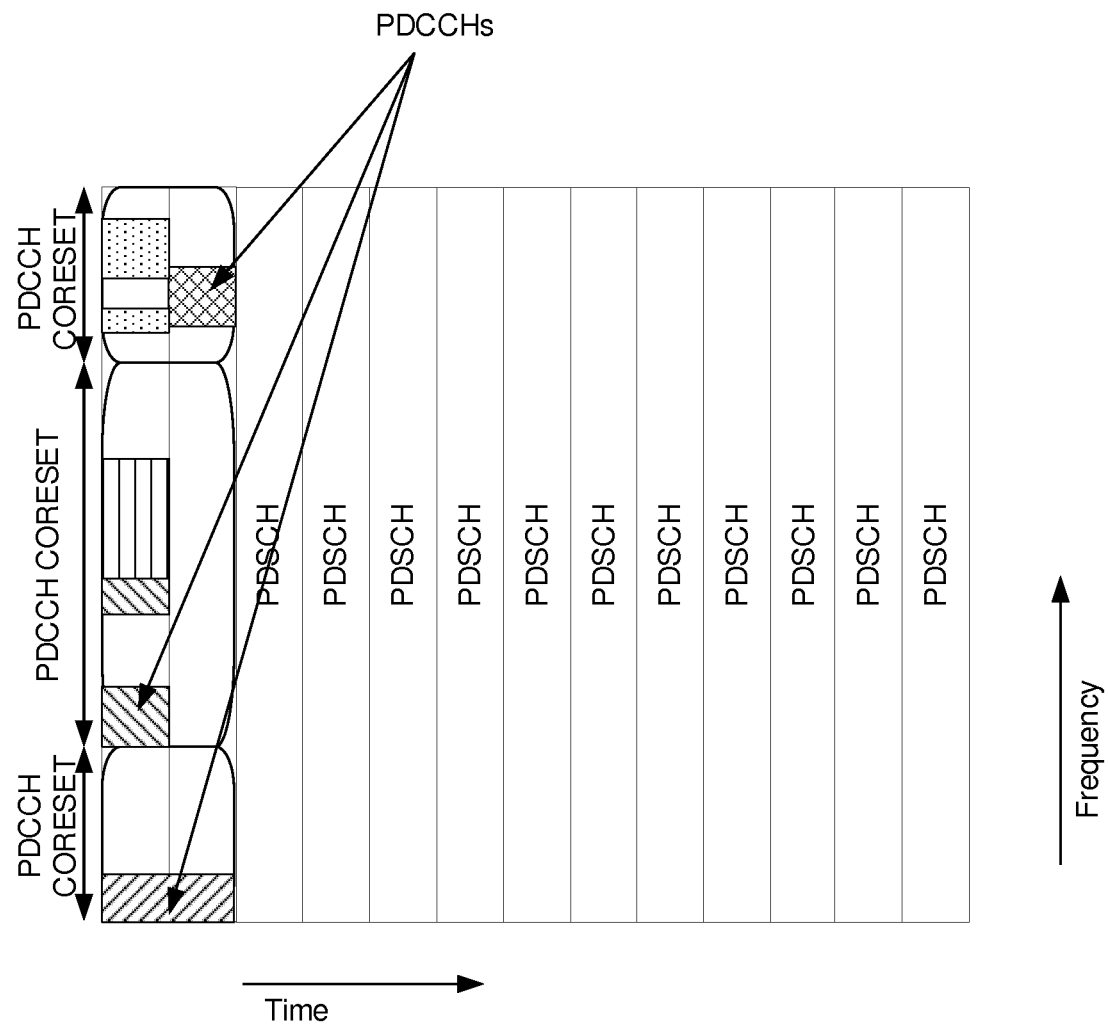
FIG. 1 shows exemplary CORESET configuration.

The solution presented herein determines a first transmission parameter (e.g., a control resource set (CORESET) or a search space) for monitoring downlink control channel scheduling for downlink control information provided to a wireless device in a first signal and selects either the first transmission parameter or one or more different transmission parameters for monitoring downlink control channel scheduling for downlink control information provided to the wireless device in one or more second signals. To allow flexibility and efficient use of resources, the first signal sent by the base station indicates the selected transmission parameters for the second signals. Before providing further details of the solution presented herein, the following first provides general information regarding wireless systems with respect to downlink control information.

In general, a signaling numerology refers to the combination of Sub-Carrier Spacing (SCS), Orthogonal Frequency Division Multiplexing (OFDM) symbol length, Cyclic Prefix (CP) length, etc., used for signal transmissions. In $3^{rd}$ Generation Partnership Project (3GPP) New Radio (NR), multiple numerologies (e.g., for SCS=$15*2^n$ kHz for n=0 . . . 5) have been defined, each with associated additional signal parameters. The $2^n$ construction indicated above allows simultaneous transmission of signals with different SCS in the same carrier during the same OFDM symbol. In some deployments, different NR signals may use different numerologies to ensure appropriate tradeoff between coverage (e.g., lower SCSs are more robust to dispersion and allow better coverage) and data capacity (e.g., higher SCSs are more robust to, e.g., phase noise).

A UE monitors for downlink (DL) control signaling responsive to a transmission parameter that defines the time and/or frequency resources for transmission of DL control channel scheduling the downlink control information. One example of a transmission parameter is a control resource set (CORESET). A CORESET defines the size of a set of contiguous or non-contiguous Physical Resource Blocks (PRBs) in the frequency domain, and one or multiple OFDM symbols in the time domain. A Physical Downlink Control Channel (PDCCH) is confined to one CORESET. While the solution presented herein is largely described in terms of CORESETs, it will be appreciated that the solution presented herein applies to other transmission parameters, including but not limited to, search spaces. It will be appreciated that search spaces are associated with CORESETs, and vice versa.

A wireless device, also referred to herein as a User Equipment (UE), monitors for the PDCCH in one or more search spaces. Each search space is associated with a CORESET, which is defined as a set of PRBs in the frequency domain and a set of OFDM symbols in the time domain. For example:

Single-symbol CORESET: frequency first mapping, interleaved or non-interleaved mapping Multi-symbol CORESET: time first mapping, interleaved or non-interleaved mapping In some systems, for slot-based scheduling, the first DeModulation Reference Signal (DMRS) position, which is either on the $3^{rd}$ symbol or the $4^{th}$ symbol, is configured by a broadcast channel, e.g., a Physical Broadcast Channel (PBCH). The maximum time duration of a CORESET is two symbols if the first DMRS position of a Physical Downlink Shared Channel (PDSCH) with slot-based scheduling is on the $3^{rd}$ symbol, and is three symbols otherwise. The set of PRBs may be noncontiguous. Multiple CORESETs can be overlapped in frequency and time for a UE.

A CORESET defines the time/frequency (T/F) size where a downlink (DL) control channel (e.g., PDCCH) is confined. Different CORESETs may be configured for transmitting different types of DL control information (associated with different types of search spaces) or for meeting the requirements of different 5G use cases (e.g., shorter time duration to reduce latency). See, e.g., FIG. 1, which shows exemplary locations of PDCCH transmissions (multiple locations/allocations are also possible) associated with a specified CORESET. Within a CORESET, multiple PDCCH resource candidates with each formed by a set of CCEs can be configured. This is configured by the RRC parameters in the associated search space configuration Information Element (IE). In addition, the associated search space IE also configures the parameters including PDCCH monitoring occasions, monitoring periodicity, monitoring duration, etc., to indicate to the UE how and where to search for the PDCCH.

The CORESET could be indicated, e.g., for Remaining Minimum System Information (RMSI), via a 3-bit configuration, i.e., one of seven possible locations or location sets, where the index 0 indicates no RMSI. In NR, the CORESET for Remaining Minimum System Information (RMSI) is indicated via four bits in the Master Information Block together with preconfigured mapping tables. The base station thus indicates the number of symbols in time and the number of RBs in frequency for the CORESET of the search space for the NR-PDCCH (New Radio-Physical Downlink Control Channel) carrying RMSI. In addition, another four bits in the MIB is used for indicating the PDCCH monitoring occasions. The CORESET configuration together with PDCCH monitoring occasion and other parameters configured for the associated search space provide the guidance to the UE where it should search for the NR-PDCCH scheduling RMSI (referred to as SIB1 in the standard).

For a (common) CORESET for PDCCH scheduling physical downlink shared channel (PDSCH) containing paging, at least the following is configured:

Time-domain resources (Time duration);

Frequency-domain resources, confined within NR UE minimum DL bandwidth (BW) or initial active DL BW for a given frequency band; and Resource Element Group (REG) bundle size, interleaved or non-interleaved (Control Channel Element (CCE) to REG mapping).

Frequency-domain resources may or may not be contiguous. Each contiguous part of a CORESET is equal to or more than the size of a REG-bundle in frequency.

Figure 2:
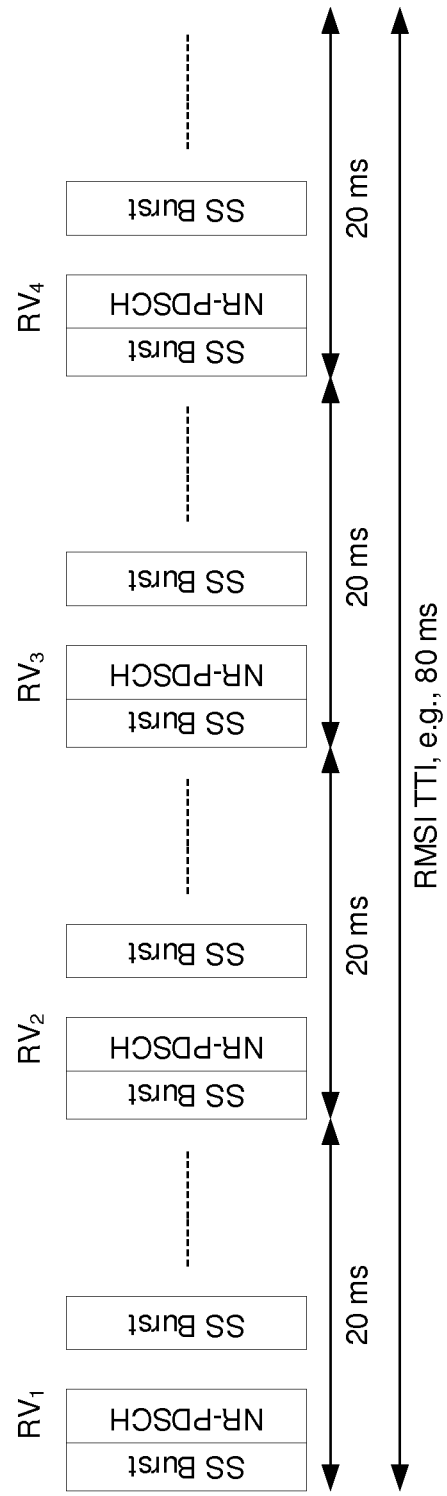
FIG. 2 shows an exemplary deployment associated with an RMSI TTI.

In NR, system access identification is performed by the UE by first receiving a Synchronization Signal (SS) block containing a primary SS (PSS) and a secondary SS (SSS) encoding the cell identifier (ID), e.g., physical cell id (PCI), and a PBCH containing MIB information. The MIB contains critical System Information (SI) and a CORESET pointer to the location of the Remaining Minimum SI (RMSI). The PBCH also informs the UE about the RMSI numerology. FIG. 2 shows an example of a Synchronization Signal Block (SSB) and RMSI transmission. In this example, the UE receives at least one SS Block and at least one redundancy version (RV) of the NR-PDSCH every 20 ms, while the Transmission Time Interval (TTI) of the RMSI is, e.g., 80 ms.

The NR-PDSCH carrying the RMSI will have a variable payload and will be scheduled using the NR-PDCCH. The physical broadcast channel (PBCH) carrying the MIB (see Table 1) contains an 8-bit field for RMSI configuration, were the CORESET configuration takes up four bits, and indicates the size of the time and frequency resources used for the NR-PDCCH. This allows for providing some assistance for the UE regarding where the UE should search for the NR-PDCCH that will schedule the RMSI (NR-SIB1).

TABLE 1

| Information | Number of bits | Comment |
| --- | --- | --- |
| RMSI Configuration | 8 | |
| Subcarrier Spacing (of RMSI, Msg. 2/4 for initial access and broadcasted OSI) | 1 | 0: 15 kHz (FR1) or 60 kHz (FR2) 1: 30 kHz (FR1) or 120 kHz (FR2) |
| System Frame Number (SFN) | 10 | |
| SS block time index | 3 | Reserved for below 6 GHz |
| Half frame indication | 1 | Also known from DMRS when L = 4 |
| "CellBarred?flag" | 1 | |
| Reserved RAN2 | 1 | |
| $1^{st}$ PDSCH DMRS position | 1 | $3^{rd}$ or $4^{th}$ symbol |
| PRB grid offset | 4 | |
| Reserved bits | 1 | |
| Cyclic Redundancy Check (CRC) | 24 | |
| Total including CRC | 56 | |

Paging is used to alert one or more UEs in inactive/idle mode to contact the network, e.g., for data reception, for emergency message distribution, for indicating SI updates, etc. In NR, paging includes paging DCI transmission (in PDCCH) followed by a paging message (in PDSCH). The UE is configured to periodically check for paging messages, according to a DRX and paging occasion (PO) schedule provided by the network (NW). It is given a CORESET to monitor for paging Downlink Control Information (DCI) transmissions in the PDCCH. For some NR networks, the numerology and/or CORESET for paging PDCCH may be the same as for RMSI, or provided in System Information Block 1 (SIB1) in the RMSI.

Random Access Response (RAR) transmission refers to transmitting a DL response to a Physical Random Access CHannel (PRACH) preamble received in the Uplink (UL). The RAR is transmitted as a PDSCH scheduled by a PDCCH with a Random Access-Radio Network Temporary Identifier (RA-RNTI). The UE monitors the PDCCH candidates scheduling RAR in the associated search space (i.e., type1-PDCCH common search space) during a RAR reception window. This search space is defined by, among other parameters, a CORESET configuration, monitoring occasions, monitoring periodicity, etc. The window starts a predetermined time gap after PRACH transmission, and has a predetermined duration known to the UE. As with paging, the numerology and/or CORESET for the RAR PDCCH may be the same as for the RMSI, or provided in SIB1 in the RMSI.

Other SI (OSI) is additional system information transmitted on demand by the NW. The network node transmits the OSI as a Physical Downlink Shared Channel (PDSCH) scheduled by a PDCCH with a dedicated RNTI. As with paging, the numerology and/or CORESET for the OSI PDCCH may be the same as for the RMSI, or provided in SIB1 in the RMSI.

There currently exist certain challenge(s). For example, forcing all other access signals' CORESET configuration parameters to be same as for the RMSI transmission imposes significant constraints in advanced deployments with special SI and paging coverage requirements. In some cases, such restrictions may limit the ability of operators to maximize their network capacity or cost efficiency for data transmissions because of SI or paging coverage or capacity limits. In other cases, requiring separate additional CORESET configuration parameters to be transmitted in the SIB1 for all other access signals results in the duplication of information and the wasting of expensive broadcast resources in many common deployments where the RMSI and other transmissions share the same resources. There is thus a need for configuring transmission parameters for different system information that avoids unnecessary broadcasting operations while supporting flexible access and paging signal transmission in advanced network deployments.

Certain aspects of the present disclosure and their embodiments may provide solutions to these or other challenges.

The network transmits at least one CORESET configuration, to be used for scheduling the transmission of RMSI/SIB1 associated with a given SSB in PBCH/MIB. It may further transmit a second CORESET configuration, to be used for receiving one or more additional signals (e.g., access-related signals like RAR, OSI, paging, etc.), in RMSI/SIB1. The network also transmits, in the RMSI/SIB1, one or more CORESET indicators or other bit sets, where the one or more CORESET indicators in some embodiments are, e.g., flag bits, where each flag bit indicates whether the respective signal will be transmitted using the first or the second CORESET.

A corresponding UE reads the CORESET flag bits in the RMSI for each relevant additional signal, and configures the receiver for that signal to use the first or second CORESET configuration for the additional signal(s). It will be appreciated that while the solution presented herein is described in terms of a CORESET configuration for the RMSI, and a different CORESET configuration optionally available for the additional signals, the solution presented herein applies equally well to the more general idea of selectively using different transmission parameters for receiving different types of DL control information. In some embodiments, the transmission parameter may comprise a CORESET, while in other embodiments, the transmission parameter may more generally comprise a search space. In all embodiments, the transmission parameter defines time and/or frequency resources for a UE to monitor a PDCCH carrying DL control channel information.

One exemplary embodiment comprises a method, implemented by a cellular network node, for second signal transmission. The method comprises determining a first configuration for a transmission parameter for system information (e.g., RMSI) signal transmission, and signaling the configuration in an information block (e.g., a MIB). The method further comprises determining a second configuration for the transmission parameter for one or more second signal transmissions, selecting which of the one or more second signals use the first configuration and which use the second configuration, and encoding the selection in a configuration flag set. The method further comprises performing the system information transmission, including transmitting the second configuration info and the configuration flag set info, and performing the second signal transmission according to the above selected configurations.

In some exemplary embodiments, the transmission parameter comprises a control resource set (CORESET).

One exemplary embodiment comprises a method, implemented by a UE, for second signal reception. The method comprises receiving a signal on a broadcast channel (e.g., PBCH), and obtaining, from the received signal (e.g., from an MIB), a first configuration for a transmission parameter for system information (e.g., RMSI). The method further comprises receiving system information (e.g., RMSI) according to the first configuration, and extracting from the received signal (e.g., from a SIB1) a second configuration for a transmission parameter and a configuration flag set for one or more second signal receptions. The method further comprises configuring receivers for the one or more second signals based on the first and second configurations and the configuration flag set, and receiving the one or more second signals according to the corresponding configuration.

One exemplary embodiment provides CORESET configuration for Random Access. Via the PBCH, a UE obtains at least one CORESET configuration at least for PDCCH scheduling RMSI associated with a given SS block. The set of aggregation levels and candidates per aggregation level for PDCCH scheduling RMSI is specified in the specification. The indication of the support of aggregation level 16 in the cell is slated for further study. Also slated for further study is the set of search spaces for OSI, random access, and paging. Via RMSI, the UE can be configured with at least one CORESET configuration at least for PDCCH for random access. If not configured by RMSI, the CORESET configuration(s) for random access is/are the one(s) configured by PBCH. Whether the CORESET configuration can be configured outside of the initial active DL BWP is slated for further study. Via UE-specific signalling, the UE can be configured with one or more CORESET configuration(s) at least for PDCCH scheduling UE-specific data. Each CORESET configuration is associated with one or more sets of search spaces. Also, each set of search spaces is associated with one CORESET configuration.

Based on this embodiment, the following is noted:
The CORESET(s) for random access including message2 (RAR)/message3-retx/message4, can be configured by the following two options:
Option 1: Use the same CORESET configuration as for RMSI indicated in PBCH.
Option 2: The CORESET configuration(s) for random access is configured by RMSI.
This embodiment does not preclude that different CORESETs are configured separately for message2(RAR)/message3/message4.

With Option 1, the same CORESET configuration is shared for RMSI, message 2, message3-retx, and message 4, which simplifies the design. On the other hand, Option 2 provides better configuration flexibility. In some case, the CORESET configured for RMSI may not be large enough to support multiple PDCCHs carrying RMSI/message 2/message 3-retx/message 4. For instance, for the case of frequency multiplexed RMSI and SSB, where the time duration for the transmission of RMSI and the CORESET for PDCCH scheduling RMSI may consist of only four OFDM symbols, the RMSI CORESET can be configured with a time duration less than four symbols. This RMSI CORESET might not be able to support multiplexing of different PDCCHs carrying messages related to random access. However, to simplify the system design, we propose that the same CORESET configuration is used for PDCCHs scheduling different random-access messages. If configured in RMSI, a single CORESET configuration is configured for random access scheduling message 2/message 3-retx/message 4. Note that the details of the CORESET configuration for random access, e.g., the set of aggregation levels and the candidates per aggregation level for PDCCH scheduling message 2/message 3-retx/message 4 can be decided in the control channel session.

Another exemplary embodiment provides CORESET configuration for paging. The currently remaining options for paging CORESET are to use the same parameters as indicated for RMSI in the PBCH or to specify them in the RMSI. There is a wide range of foreseeable NR deployments, including co-existence needs with LTE in some cases and different coverage requirements for different signals in the NR NW. Therefore, requiring that paging transmission be limited to the same CORESET as the RMSI is likely to be limiting for efficient NW configuration in many deployments. These paging signal parameters should therefore be separately configurable in RMSI. However, to avoid duplicate CORESET info when it is unnecessary, it may be adopted as a default assumption that, in the absence of paging CORESET configuration info in the RMSI, the respective RMSI parameters apply.

In one option, the paging CORESET should be configurable in the RMSI. In the absence of paging CORESET configuration info in the RMSI, the CORESET parameters indicated for RMSI in PBCH apply. For a (common) CORESET for PDCCH scheduling PDSCH containing paging, at least the following is configured:

Time and Frequency-domain resources, confined within NR UE minimum DL BW or initial active DL BWP for a given frequency band;
REG bundle size, interleaved or non-interleaved (CCE to REG mapping); and
Monitoring periodicity, slot based or non-slot based.

In order to maintain a uniform approach to DCI handling in different signaling contexts, NR paging should use the same CORESET and DCI framework as e.g. RMSI and RAR signaling.

In another option, the paging CORESET configuration indicates the resource of the PDCCH that schedules the PDSCH carrying paging message, including at least the bandwidth (PRBs), frequency position and the CORESET duration and the relevant OFDM symbols. The details of the message 2 CORESET configuration, e.g., the set of aggregation levels and the candidates per aggregation level for PDCCH scheduling message 2 can be decided in the control channel session.

The DCI search space for a given CORESET includes the set of possible PDCCH CCE allocation and Aggregation Level (AL) options. To minimize signaling, the search space definition for RMSI associated with its CORESET may be reused for paging PDCCH search space.

In another option, the search space definition for paging PDCCH associated with the paging CORESET is the same as the search space definition for RMSI PDCCH associated with the RMSI CORESET.

Exemplary embodiments of the solution presented herein may provide one or more of the following technical advantage(s). The solution presented herein provides a CORESET configuration approach that only broadcasts limited CORESET configuration information while supporting individual configuration of CORESETs for a large number of additional signals transmitted by the network. Further, the solution presented herein thus avoids unnecessary broadcasting operations while supporting flexible network configurations in various deployments.

Figure 3:
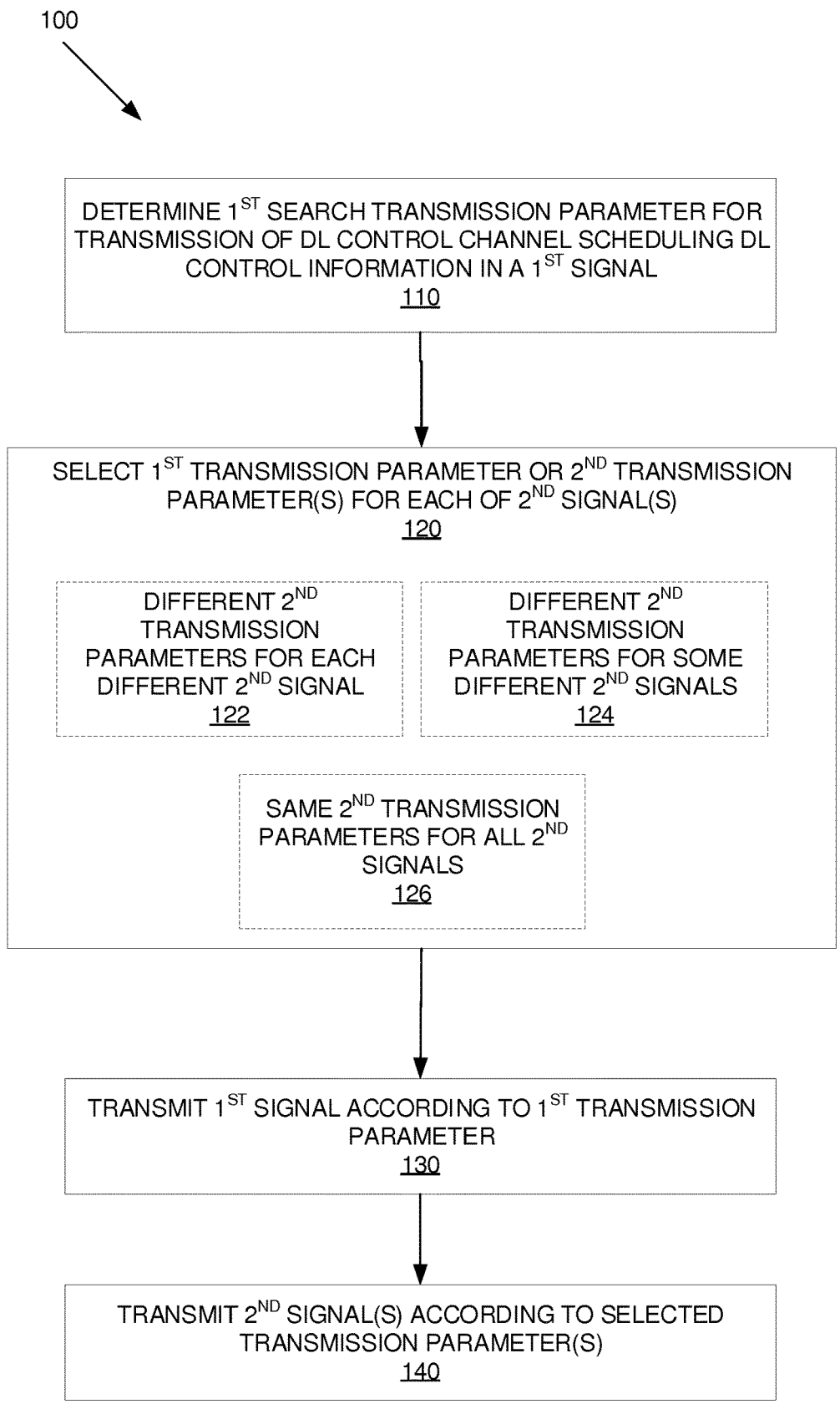
FIG. 3 shows a method of search space configuration and signal transmission according to exemplary embodiments of the solution presented herein.

FIG. 3 depicts a method 100 in accordance with particular embodiments. The method 100, which is implemented by a network node in the network, comprises determining a first transmission parameter defining first time and/or frequency resources for transmission of downlink control channel scheduling the downlink control information in a first signal (block 110). The method 100 further comprises selecting, for each of one or more second signals, the first transmission parameter or one or more second transmission parameters, each different from the first transmission parameter (block 120). The one or more second transmission parameters define different second time and/or frequency resources for transmission of the downlink control channel scheduling the downlink control information in the one or more second signals. In some embodiments, the second transmission parameter(s) comprise a different second transmission parameter for each different second signal (block 122). In some embodiments, the second transmission parameter(s) comprise a different second transmission parameter for some of the second signals (block 124). In some embodiments, the second transmission parameter(s) comprise the same second transmission parameter for each second signal (block 126). The method 100 further comprises transmitting the first signal to the wireless device according to the first transmission parameter (block 130). The first signal comprises the one or more second transmission parameters and a configuration indication indicating the selected transmission parameter for each of the one or more second signals. The method 100 further comprises transmitting the one or more second signals to the wireless device according to the corresponding selected transmission parameter (block 140).

Figure 4:
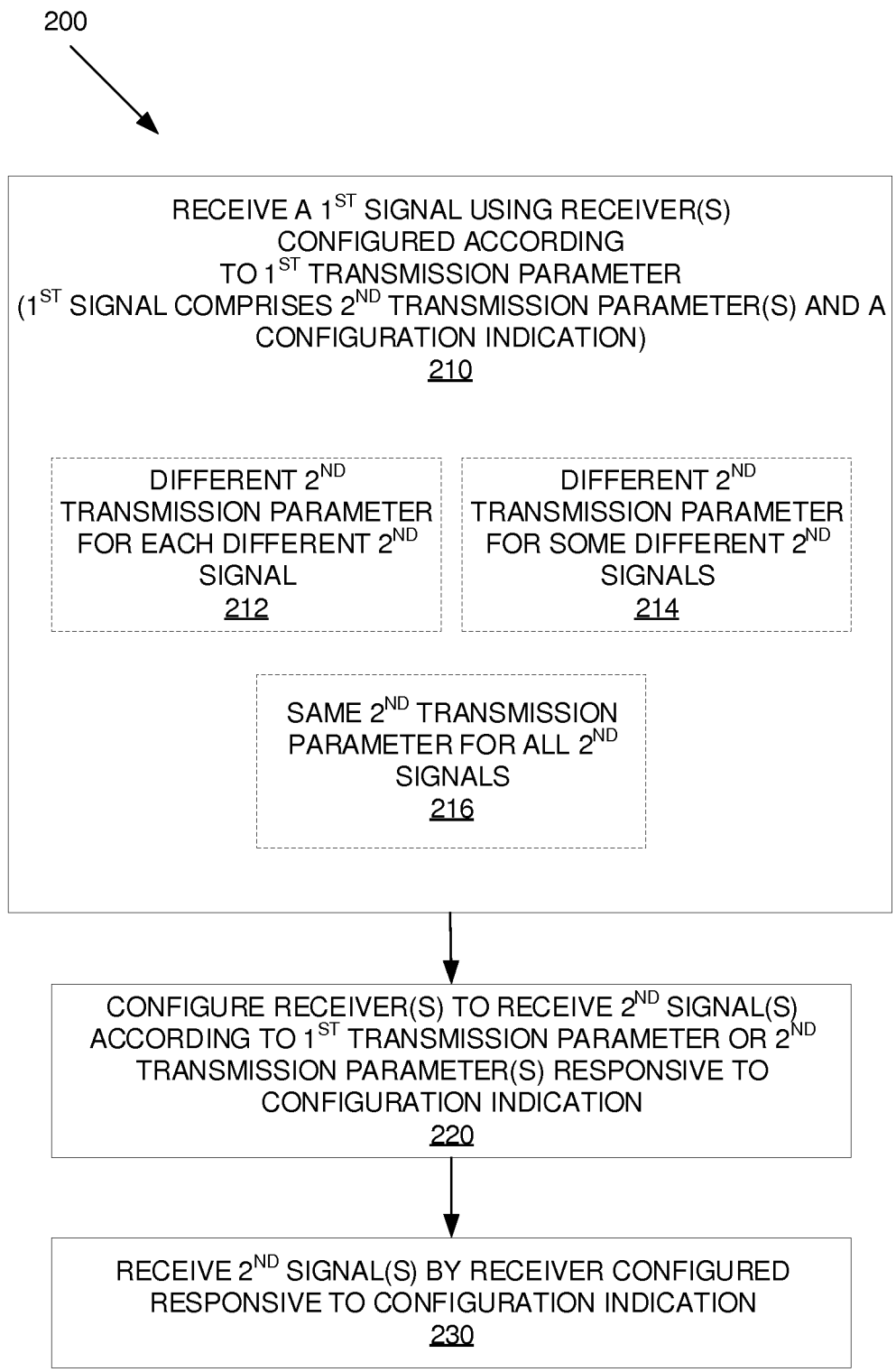
FIG. 4 shows a method of receiving signals and determining search space configurations according to exemplary embodiments of the solution presented herein.

FIG. 4 depicts a method 200 in accordance with other particular embodiments. The method 200, which is implemented by a wireless device, comprises receiving a first signal using at least one receiver configured according to a first transmission parameter defining first time and/or frequency resources for monitoring downlink control channel scheduling for downlink control information included in the first signal (block 210). The first signal comprises one or more second transmission parameters and a configuration indication. The one or more second transmission parameters, which are each different from the first transmission parameter, each define different second time and/or frequency resources for monitoring downlink control channel scheduling for the downlink control information included in one or more second signals. The configuration indication indicates a selection, by the network node, of the first transmission parameter or the one or more second transmission parameters for each of the one or more second signals. In some embodiments, the second transmission parameter(s) comprise a different second transmission parameter for each different second signal (block 212). In some embodiments, the second transmission parameter(s) comprise a different second transmission parameter for some of the second signals (block 214). In some embodiments, the second transmission parameter(s) comprise the same second transmission parameter for each second signal (block 216). The method 200 further comprises configuring at least one receiver in the wireless device for receiving each of the one or more second signals according to the first transmission parameter or the one or more second transmission parameters responsive to the configuration indication (block 220), and receiving the one or more second signals using the at least one receiver configured responsive to the configuration indication (block 230).

Note that the apparatuses referenced above may perform the methods herein and any other processing by implementing any functional means, modules, units, or circuitry. In one embodiment, for example, the apparatuses comprise respective circuits or circuitry configured to perform the steps shown in FIGS. 3 and 4. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 5:
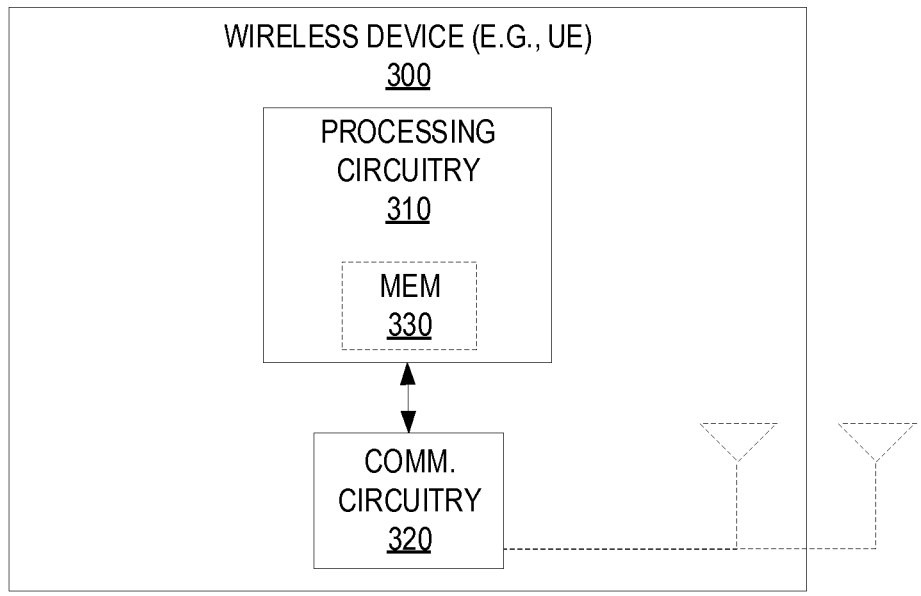
FIG. 5 shows a wireless device according to one exemplary embodiment.

FIG. 5, for example, illustrates a wireless device 300 as implemented in accordance with one or more embodiments. As shown, the wireless device 300 includes processing circuitry 310 and communication circuitry 320. The communication circuitry 320 (e.g., radio circuitry) is configured to transmit and/or receive information to and/or from one or more other nodes, e.g., via any communication technology. Such communication may occur via one or more antennas that are either internal or external to the wireless device 300. The processing circuitry 310 is configured to perform processing described above (e.g., as shown in FIG. 4), such as by executing instructions stored in memory 330. The processing circuitry 310 in this regard may implement certain functional means, units, circuits, or modules.

Figure 6:
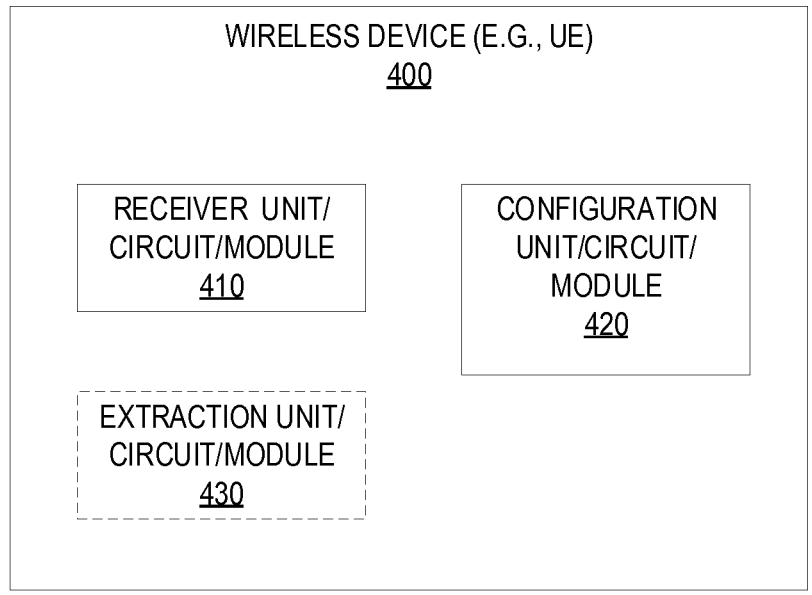
FIG. 6 shows a wireless device according to another exemplary embodiment.
Figure 10:
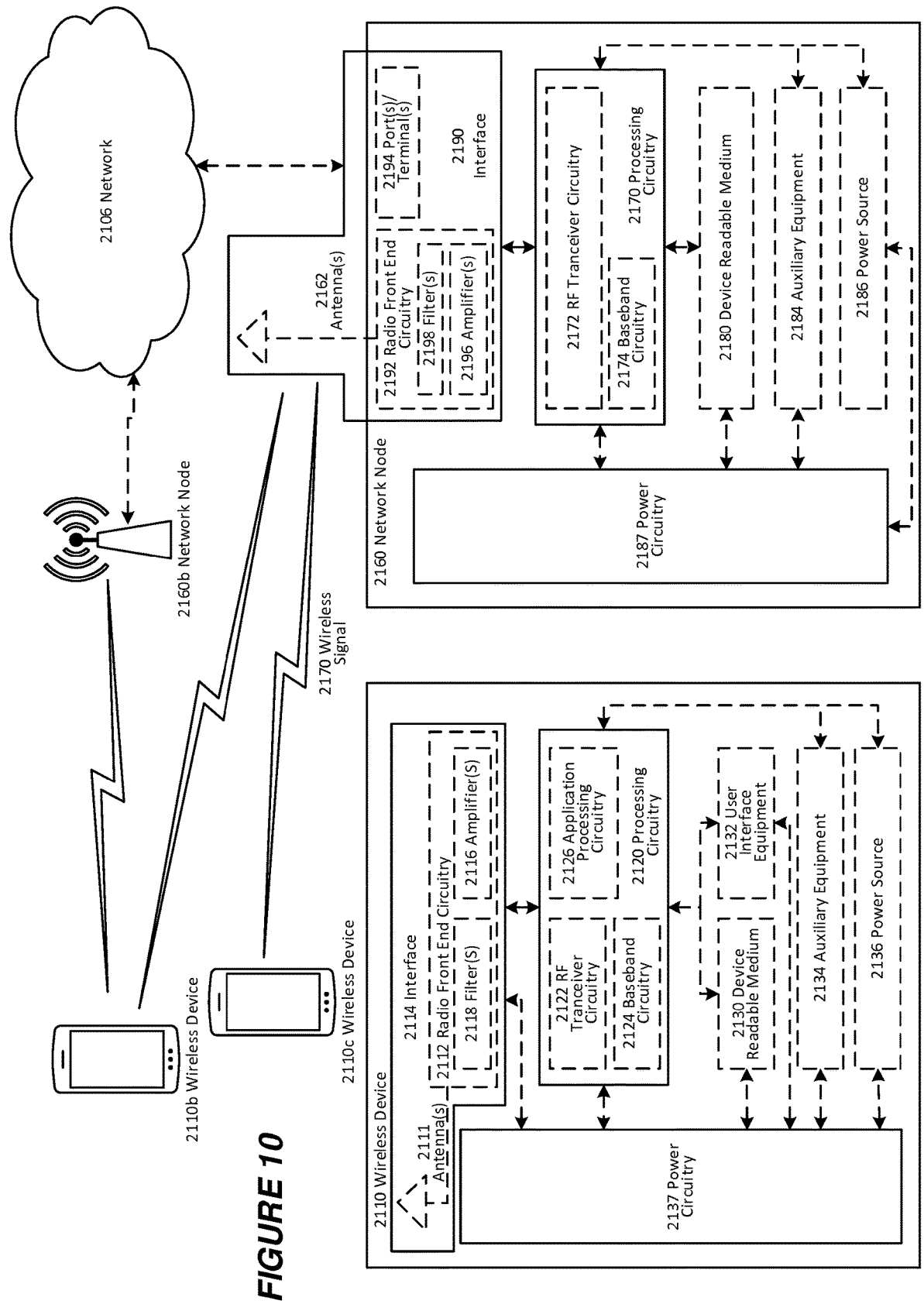
FIG. 10 shows an exemplary wireless network applicable to the solution presented herein.

FIG. 6 illustrates a schematic block diagram of a wireless device 400 in a wireless network according to still other embodiments (for example, the wireless network shown in FIG. 10). As shown, the wireless device 400 implements various functional means, units, circuits, or modules, e.g., via the processing circuitry 310 in FIG. 5 and/or via software code. These functional means, units, circuits, or modules, e.g., for implementing the method(s) herein, include for instance: receiver unit/circuit/module 410, configuration unit/circuit/module 420, and optional extraction unit/circuit/module 430. The receiver unit/circuit/module 410 is configured to receive a first signal according to a first transmission parameter defining first time and/or frequency resources for monitoring downlink control channel scheduling for downlink control information included in the first signal. The first signal comprises one or more second transmission parameters and a configuration indication. The one or more second transmission parameters, which are each different from the first transmission parameter, each define different second time and/or frequency resources for monitoring downlink control channel scheduling for the downlink control information included in one or more second signals. The configuration indication indicates a selection, by the network node, of the first transmission parameter or the one or more second transmission parameters for each of the one or more second signals. The configuration unit/circuit/module 420 configures at least one receiver 410 in the wireless device 400 for receiving each of the one or more second signals according to the first transmission parameter or the one or more second transmission parameters responsive to the configuration indication. The receiver unit/circuit/module 410, as configured responsive to the configuration indication, receives the one or more second signals. In some embodiments, the wireless device 400 includes an optional extraction unit/circuit/module 430 configured to extract the one or more second transmission parameters and the configuration indication from the first signal, e.g., for storage in memory (not shown).

Figure 7:
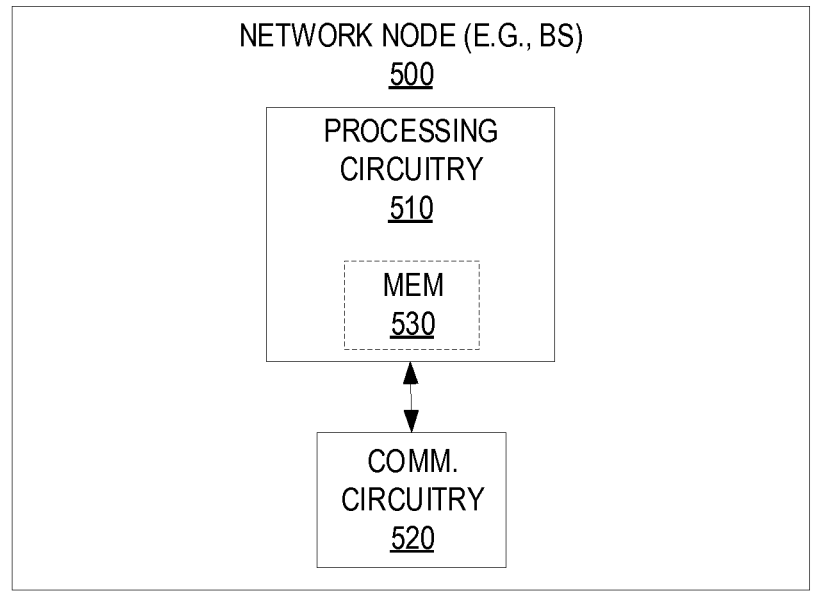
FIG. 7 shows a network node according to one exemplary embodiment.

FIG. 7 illustrates a network node 500 as implemented in accordance with one or more embodiments. As shown, the network node 500 includes processing circuitry 510 and communication circuitry 520. The communication circuitry 520 is configured to transmit and/or receive information to and/or from one or more other nodes, e.g., via any communication technology. The processing circuitry 510 is configured to perform processing described above (e.g., as shown in FIG. 3), such as by executing instructions stored in memory 530. The processing circuitry 510 in this regard may implement certain functional means, units, or modules.

Figure 8:
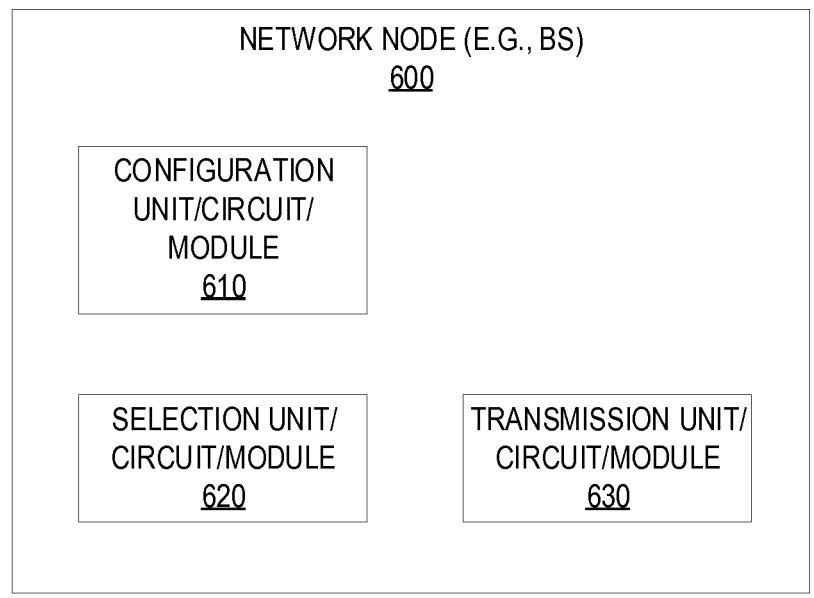
FIG. 8 shows a network node according to another exemplary embodiment.

FIG. 8 illustrates a schematic block diagram of a network node 600 in a wireless network according to still other embodiments (for example, the wireless network shown in FIG. 10). As shown, the network node 600 implements various functional means, units, circuits, or modules, e.g., via the processing circuitry 510 in FIG. 7 and/or via software code. These functional means, units, circuits, or modules, e.g., for implementing the method(s) herein, include for instance: a configuration unit/circuit/module 610, a selection unit/circuit/module 620, and a transmission unit/circuit/module 630. The configuration unit/circuit/module 610 is configured to determine a first transmission parameter defining first time and/or frequency resources for transmission of downlink control channel scheduling the downlink control information in a first signal. The selection unit/circuit/module 620 is configured to select, for each of one or more second signals, the first transmission parameter or one or more second transmission parameters, each different from the first transmission parameter. The one or more second transmission parameters define different second time and/or frequency resources for transmission of the downlink control channel scheduling the downlink control information in the one or more second signals. The transmission unit/circuit/module 630 is configured to transmit the first signal to the wireless device according to the first transmission parameter. The first signal comprises the one or more second transmission parameters and a configuration indication indicating the selected transmission parameter for each of the one or more second signals. The transmission unit/circuit/module is further configured to transmit the one or more second signals to the wireless device according to the corresponding selected transmission parameter.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

The flow of one exemplary embodiment of the solution presented herein, as implemented by the network node comprises the following. Referring to the presented background, the term "transmission parameter" here primarily refers to the CORESET, but it could also refer to other parameters like PDCCH search spaces, DCI formats, signal numerology, etc.

According to this exemplary embodiment, the network node determines an RMSI transmission parameter configuration. For example, an NR network node may determine at least one CORESET configuration for scheduling an RMSI transmission. The choice may be based on, e.g., the network node (e.g., an RMSI CORESET with multiple search options offers increased flexibility for scheduling RMSI without interfering with data transmission), etc. The network node signals the RMSI transmission parameter configuration in the MIB, e.g., according to existing 2GPP RAN1 standards. The network node further determines alternative transmission parameter configurations, e.g., an additional CORESET configuration for additional signal transmission(s). The additional signals may be, e.g., RAR, OSI, paging, message3-rtx, message4, etc. The choice may be based on overall network load, access signalling load, latency requirements, the number of UEs in idle and inactive states and their paging signalling (e.g., an alternative CORESET that differs from the RMSI CORESET offers increased flexibility for paging and random access scheduling), etc. The network node selects, for each of one or more additional signals, whether the RMSI transmission parameter configuration or the alternative transmission parameter configuration will be used. For example, the criteria in the configuration determination step may be applied to each corresponding additional signal. The network node further determines a transmission parameter configuration indicator, which in some embodiments comprises a flag set, in the RMSI/SIB1 based on the selected transmission parameter configuration modes. For example, the network node may create a CORESET indicator that includes one or more bits conveying the selected decision. The network node transmits the RMSI, including the alternative configuration and the indicator, and transmits the one or more additional signals according to the selected transmission parameters.

In one exemplary embodiment, the indicator is a bitmap where each bit position corresponds to the section for a predetermined signal. As an example, a 0 in the first position may indicate that RAR PDCCH is transmitted according to the RMSI CORESET, and a 1 in that position may indicate that the RAR PDCCH is transmitted according to the alternative CORESET. The second position indicates the same for OSI selection, the third for paging selection, etc.

In another exemplary embodiment, the indicator is encoded into one of multiple possible values that imply one of the bitmaps above. As an example, value 00 may indicate that all additional signals use the RMSI CORESET, value 01 that only RAR uses the alternative CORESET, value 10 that only paging uses the alternative CORESET, and value 11 that all additional signals use the alternative CORESET. It will be appreciated that other approaches for mapping the values to the CORESET selections for the different functions (RAR, paging, OSI, etc.) may be used.

In another exemplary embodiment, the indicator includes only a single bit, where the bit value indicates whether the alternative CORESET is used for all additional signals. For example, a 0 implies the CORESET for scheduling RMSI is used for all additional signals, and a 1 implies that the alternative CORESET is used for all additional signals.

In one exemplary embodiment, if the network node does not select the alternative CORESET configuration for any of the additional signals, the network node may omit the alternative CORESET configuration info, the CORESET indicator, or both. Such an omission represents, e.g., an implicit configuration indication.

The flow of one exemplary embodiment of the solution presented herein, as implemented by the network node comprises the following. The wireless device receives the PBCH and obtains the RMSI transmission parameter configuration from the MIB by decoding the MIB information and extracting the RMSI transmission parameter information. The wireless device then receives the RMSI according to the transmission parameter configuration, e.g., by configuring the receiver according to the transmission parameter configuration and decoding the RMSI to obtain the SIB1 information. The wireless device extracts from the SIB2 the alternative transmission parameter configuration information and the transmission parameter configuration indicator. For example, after the wireless device decodes the SIB1, the wireless device extracts the alternative CORESET configuration information and the CORESET indicator. For each additional signal represented in the indicator, the wireless device configures the receiver to use the RMSI transmission parameter configuration or the alternative transmission parameter configuration based on the flag bit values. For example, the wireless device configures the receiver to receive one or more additional signals according to the indicator in the SIB1. For each bit position, the corresponding additional signal is received using the RMSI CORESET or the alternative CORESET, depending on the bit value (0 or 1) at that position. In one exemplary embodiment, if the indicator and/or the alternative CORESET configuration is not present, the wireless device is implicitly instructed to apply the RMSI CORESET to all additional signal reception. The wireless device then receives the additional signals according to the adopted configuration. It will be appreciated that other forms of implicit configuration indications may also be used for the solution presented herein.

Figure 9:
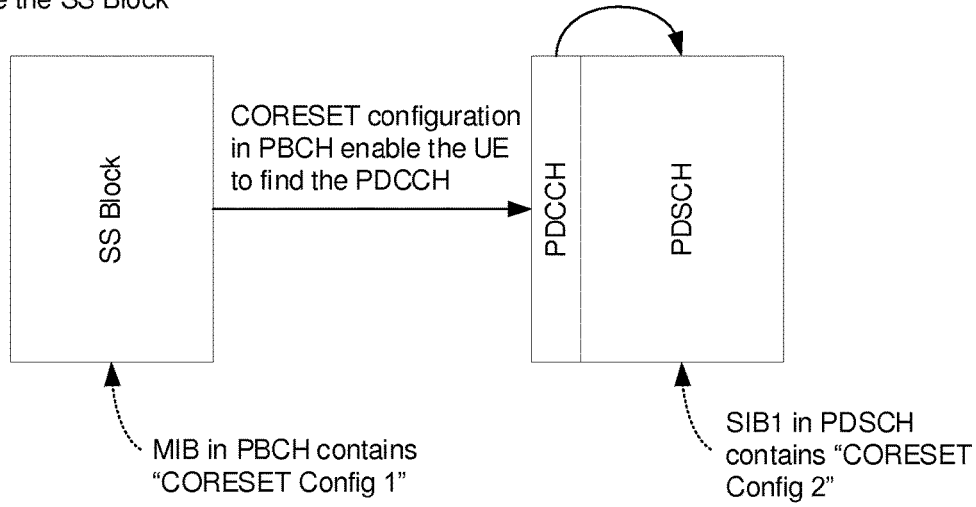
FIG. 9 shows an exemplary embodiment of the solution presented herein.

FIG. 9 shows an example of the solution presented herein. The top part of FIG. 9 depicts the physical channels in which the CORESET configurations are provided. Starting with the SS Block, it includes a primary synchronization signals (PSS), a secondary synchronization signal (SSS) and a physical broadcast channel (PBCH). The PBCH contains a master information block (MIB) which provides the UE with a first CORESET used for receiving the remaining minimum system information (RMSI). Inside the CORESET defined in the PBCH, the UE will find a physical downlink control channel (PDCCH) containing a downlink control information (DCI) that schedules a physical downlink shared channel (PDSCH).

The minimum system information (SI) includes the system information derived from the SS Block and the remaining minimum system information (RMSI) provided in system information block 1 (SIB1).

In some deployments the CORESET defined in the MIB is not sufficient for also supporting some of the additional functions that are needed, e.g., provisioning of paging messages, random access messages (MSG2, scheduling of MSG3, and MSG4), and provisioning of on-demand other system information (OSI, defined as all SI not part of the minimum SI). For that purpose, the SIB1 contains an information field where a second CORESET is defined (note that this second CORESET configuration could be optional, in which case the solution disclosed here only applies when it is actually defined). Assuming that a second CORESET (denoted CoresetConfig2) is configured in SIB1, we can now select which CORESET that should be used for other functions. In the example embodiment we see that the SIB1 contains of a Paging configuration, an OSI configuration, a RAR configuration, and a generic (yet to be defined) functionXconfiguration.

Each of these configurations comprises of a CORESET selection configuration (denoted coreSetSelection). The value "coreSetSelection=1" would in this example embodiment denote that the "first" CORESET defined in the MIB is used for this function while the value "coreSetSelection=2" would denote that the "second" CORESET defined in SIB1 is used.

Note that the SIB1 may contain more than one CORESET definition and in that case the "coreSetSelection" parameters would be extended with more alternatives.

In other embodiments, the relevant parameter may be called "controlResourceSetId" or "searchSpaceId."

The disclosed techniques may be used to configure transmission parameters other than the CORESET, e.g. PDCCH search spaces associated with the CORESET, signal numerology, etc.

The approach of the solution presented herein may be applied to signals other than the mentioned access, SI, and paging signals. CORESETS or other parameters for other control signals, dedicated, and UE-specific signals may also be indicated.

The terminology used herein has been aligned with 3GPP NR RAN1-2 agreements. However, the principles of the embodiments may be applicable to other RATs and cellular network implementations.

In some embodiments, the PBCH/MIB and/or RMSI/SIB1 can contain multiple CORESET definitions. In that case, the first and second CORESET configurations should be understood to contain all the CORESETs specified in the MIB and SIB1 respectively.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 2106, network nodes 2160 and 2160b, and WDs 2110, 2110b, and 2110c. In practice, a wireless network may further include any additional elements suitable to support communication between wireless devices or between a wireless device and another communication device, such as a landline telephone, a service provider, or any other network node or end device. Of the illustrated components, network node 2160 and wireless device (WD) 2110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2160 and WD 2110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 2160 includes processing circuitry 2170, device readable medium 2180, interface 2190, auxiliary equipment 2184, power source 2186, power circuitry 2187, and antenna 2162. Although network node 2160 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 2160 are depicted as single boxes located within a larger box, or nested within multiple boxes, in practice, a network node may comprise multiple different physical components that make up a single illustrated component (e.g., device readable medium 2180 may comprise multiple separate hard drives as well as multiple RAM modules).

Similarly, network node 2160 may be composed of multiple physically separate components (e.g., a NodeB component and a RNC component, or a BTS component and a BSC component, etc.), which may each have their own respective components. In certain scenarios in which network node 2160 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 2160 may be configured to support multiple radio access technologies (RATs). In such embodiments, some components may be duplicated (e.g., separate device readable medium 2180 for the different RATs) and some components may be reused (e.g., the same antenna 2162 may be shared by the RATs). Network node 2160 may also include multiple sets of the various illustrated components for different wireless technologies integrated into network node 2160, such as, for example, GSM, WCDMA, LTE, NR, WiFi, or Bluetooth wireless technologies. These wireless technologies may be integrated into the same or different chip or set of chips and other components within network node 2160.

Processing circuitry 2170 is configured to perform any determining, calculating, or similar operations (e.g., certain obtaining operations) described herein as being provided by a network node. These operations performed by processing circuitry 2170 may include processing information obtained by processing circuitry 2170 by, for example, converting the obtained information into other information, comparing the obtained information or converted information to information stored in the network node, and/or performing one or more operations based on the obtained information or converted information, and as a result of said processing making a determination.

Processing circuitry 2170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2160 components, such as device readable medium 2180, network node 2160 functionality. For example, processing circuitry 2170 may execute instructions stored in device readable medium 2180 or in memory within processing circuitry 2170. Such functionality may include providing any of the various wireless features, functions, or benefits discussed herein. In some embodiments, processing circuitry 2170 may include a system on a chip (SOC).

In some embodiments, processing circuitry 2170 may include one or more of radio frequency (RF) transceiver circuitry 2172 and baseband processing circuitry 2174. In some embodiments, radio frequency (RF) transceiver circuitry 2172 and baseband processing circuitry 2174 may be on separate chips (or sets of chips), boards, or units, such as radio units and digital units. In alternative embodiments, part or all of RF transceiver circuitry 2172 and baseband processing circuitry 2174 may be on the same chip or set of chips, boards, or units In certain embodiments, some or all of the functionality described herein as being provided by a network node, base station, eNB or other such network device may be performed by processing circuitry 2170 executing instructions stored on device readable medium 2180 or memory within processing circuitry 2170. In alternative embodiments, some or all of the functionality may be provided by processing circuitry 2170 without executing instructions stored on a separate or discrete device readable medium, such as in a hard-wired manner. In any of those embodiments, whether executing instructions stored on a device readable storage medium or not, processing circuitry 2170 can be configured to perform the described functionality. The benefits provided by such functionality are not limited to processing circuitry 2170 alone or to other components of network node 2160, but are enjoyed by network node 2160 as a whole, and/or by end users and the wireless network generally.

Device readable medium 2180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 2170. Device readable medium 2180 may store any suitable instructions, data or information, including a computer program, software, an application including one or more of logic, rules, code, tables, etc. and/or other instructions capable of being executed by processing circuitry 2170 and, utilized by network node 2160. Device readable medium 2180 may be used to store any calculations made by processing circuitry 2170 and/or any data received via interface 2190. In some embodiments, processing circuitry 2170 and device readable medium 2180 may be considered to be integrated.

Interface 2190 is used in the wired or wireless communication of signalling and/or data between network node 2160, network 2106, and/or WDs 2110. As illustrated, interface 2190 comprises port(s)/terminal(s) 2194 to send and receive data, for example to and from network 2106 over a wired connection. Interface 2190 also includes radio front end circuitry 2192 that may be coupled to, or in certain embodiments a part of, antenna 2162. Radio front end circuitry 2192 comprises filters 2198 and amplifiers 2196. Radio front end circuitry 2192 may be connected to antenna 2162 and processing circuitry 2170. Radio front end circuitry may be configured to condition signals communicated between antenna 2162 and processing circuitry 2170. Radio front end circuitry 2192 may receive digital data that is to be sent out to other network nodes or WDs via a wireless connection. Radio front end circuitry 2192 may convert the digital data into a radio signal having the appropriate channel and bandwidth parameters using a combination of filters 2198 and/or amplifiers 2196. The radio signal may then be transmitted via antenna 2162. Similarly, when receiving data, antenna 2162 may collect radio signals which are then converted into digital data by radio front end circuitry 2192. The digital data may be passed to processing circuitry 2170. In other embodiments, the interface may comprise different components and/or different combinations of components.

In certain alternative embodiments, network node 2160 may not include separate radio front end circuitry 2192, instead, processing circuitry 2170 may comprise radio front end circuitry and may be connected to antenna 2162 without separate radio front end circuitry 2192. Similarly, in some embodiments, all or some of RF transceiver circuitry 2172 may be considered a part of interface 2190. In still other embodiments, interface 2190 may include one or more ports or terminals 2194, radio front end circuitry 2192, and RF transceiver circuitry 2172, as part of a radio unit (not shown), and interface 2190 may communicate with baseband processing circuitry 2174, which is part of a digital unit (not shown).

Antenna 2162 may include one or more antennas, or antenna arrays, configured to send and/or receive wireless signals. Antenna 2162 may be coupled to radio front end circuitry 2190 and may be any type of antenna capable of transmitting and receiving data and/or signals wirelessly. In some embodiments, antenna 2162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 2162 may be separate from network node 2160 and may be connectable to network node 2160 through an interface or port.

Antenna 2162, interface 2190, and/or processing circuitry 2170 may be configured to perform any receiving operations and/or certain obtaining operations described herein as being performed by a network node. Any information, data and/or signals may be received from a wireless device, another network node and/or any other network equipment. Similarly, antenna 2162, interface 2190, and/or processing circuitry 2170 may be configured to perform any transmitting operations described herein as being performed by a network node. Any information, data and/or signals may be transmitted to a wireless device, another network node and/or any other network equipment.

Power circuitry 2187 may comprise, or be coupled to, power management circuitry and is configured to supply the components of network node 2160 with power for performing the functionality described herein. Power circuitry 2187 may receive power from power source 2186. Power source 2186 and/or power circuitry 2187 may be configured to provide power to the various components of network node 2160 in a form suitable for the respective components (e.g., at a voltage and current level needed for each respective component). Power source 2186 may either be included in, or external to, power circuitry 2187 and/or network node 2160. For example, network node 2160 may be connectable to an external power source (e.g., an electricity outlet) via an input circuitry or interface such as an electrical cable, whereby the external power source supplies power to power circuitry 2187. As a further example, power source 2186 may comprise a source of power in the form of a battery or battery pack which is connected to, or integrated in, power circuitry 2187. The battery may provide backup power should the external power source fail. Other types of power sources, such as photovoltaic devices, may also be used.

Alternative embodiments of network node 2160 may include additional components beyond those shown in FIG. 10 that may be responsible for providing certain aspects of the network node's functionality, including any of the functionality described herein and/or any functionality necessary to support the subject matter described herein. For example, network node 2160 may include user interface equipment to allow input of information into network node 2160 and to allow output of information from network node 2160. This may allow a user to perform diagnostic, maintenance, repair, and other administrative functions for network node 2160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 2110 includes antenna 2111, interface 2114, processing circuitry 2120, device readable medium 2130, user interface equipment 2132, auxiliary equipment 2134, power source 2136 and power circuitry 2137. WD 2110 may include multiple sets of one or more of the illustrated components for different wireless technologies supported by WD 2110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 2110.

Antenna 2111 may include one or more antennas or antenna arrays, configured to send and/or receive wireless signals, and is connected to interface 2114. In certain alternative embodiments, antenna 2111 may be separate from WD 2110 and be connectable to WD 2110 through an interface or port. Antenna 2111, interface 2114, and/or processing circuitry 2120 may be configured to perform any receiving or transmitting operations described herein as being performed by a WD. Any information, data and/or signals may be received from a network node and/or another WD. In some embodiments, radio front end circuitry and/or antenna 2111 may be considered an interface.

As illustrated, interface 2114 comprises radio front end circuitry 2112 and antenna 2111. Radio front end circuitry 2112 comprises one or more filters 2118 and amplifiers 2116. Radio front end circuitry 2114 is connected to antenna 2111 and processing circuitry 2120, and is configured to condition signals communicated between antenna 2111 and processing circuitry 2120. Radio front end circuitry 2112 may be coupled to or a part of antenna 2111. In some embodiments, WD 2110 may not include separate radio front end circuitry 2112; rather, processing circuitry 2120 may comprise radio front end circuitry and may be connected to antenna 2111. Similarly, in some embodiments, some or all of RF transceiver circuitry 2122 may be considered a part of interface 2114. Radio front end circuitry 2112 may receive digital data that is to be sent out to other network nodes or WDs via a wireless connection. Radio front end circuitry 2112 may convert the digital data into a radio signal having the appropriate channel and bandwidth parameters using a combination of filters 2118 and/or amplifiers 2116. The radio signal may then be transmitted via antenna 2111. Similarly, when receiving data, antenna 2111 may collect radio signals which are then converted into digital data by radio front end circuitry 2112. The digital data may be passed to processing circuitry 2120. In other embodiments, the interface may comprise different components and/or different combinations of components.

Processing circuitry 2120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 2110 components, such as device readable medium 2130, WD 2110 functionality. Such functionality may include providing any of the various wireless features or benefits discussed herein. For example, processing circuitry 2120 may execute instructions stored in device readable medium 2130 or in memory within processing circuitry 2120 to provide the functionality disclosed herein.

As illustrated, processing circuitry 2120 includes one or more of RF transceiver circuitry 2122, baseband processing circuitry 2124, and application processing circuitry 2126. In other embodiments, the processing circuitry may comprise different components and/or different combinations of components. In certain embodiments processing circuitry 2120 of WD 2110 may comprise a SOC. In some embodiments, RF transceiver circuitry 2122, baseband processing circuitry 2124, and application processing circuitry 2126 may be on separate chips or sets of chips. In alternative embodiments, part or all of baseband processing circuitry 2124 and application processing circuitry 2126 may be combined into one chip or set of chips, and RF transceiver circuitry 2122 may be on a separate chip or set of chips. In still alternative embodiments, part or all of RF transceiver circuitry 2122 and baseband processing circuitry 2124 may be on the same chip or set of chips, and application processing circuitry 2126 may be on a separate chip or set of chips. In yet other alternative embodiments, part or all of RF transceiver circuitry 2122, baseband processing circuitry 2124, and application processing circuitry 2126 may be combined in the same chip or set of chips. In some embodiments, RF transceiver circuitry 2122 may be a part of interface 2114. RF transceiver circuitry 2122 may condition RF signals for processing circuitry 2120.

In certain embodiments, some or all of the functionality described herein as being performed by a WD may be provided by processing circuitry 2120 executing instructions stored on device readable medium 2130, which in certain embodiments may be a computer-readable storage medium. In alternative embodiments, some or all of the functionality may be provided by processing circuitry 2120 without executing instructions stored on a separate or discrete device readable storage medium, such as in a hard-wired manner. In any of those particular embodiments, whether executing instructions stored on a device readable storage medium or not, processing circuitry 2120 can be configured to perform the described functionality. The benefits provided by such functionality are not limited to processing circuitry 2120 alone or to other components of WD 2110, but are enjoyed by WD 2110 as a whole, and/or by end users and the wireless network generally.

Processing circuitry 2120 may be configured to perform any determining, calculating, or similar operations (e.g., certain obtaining operations) described herein as being performed by a WD. These operations, as performed by processing circuitry 2120, may include processing information obtained by processing circuitry 2120 by, for example, converting the obtained information into other information, comparing the obtained information or converted information to information stored by WD 2110, and/or performing one or more operations based on the obtained information or converted information, and as a result of said processing making a determination.

Device readable medium 2130 may be operable to store a computer program, software, an application including one or more of logic, rules, code, tables, etc. and/or other instructions capable of being executed by processing circuitry 2120. Device readable medium 2130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 2120. In some embodiments, processing circuitry 2120 and device readable medium 2130 may be considered to be integrated.

User interface equipment 2132 may provide components that allow for a human user to interact with WD 2110. Such interaction may be of many forms, such as visual, audial, tactile, etc. User interface equipment 2132 may be operable to produce output to the user and to allow the user to provide input to WD 2110. The type of interaction may vary depending on the type of user interface equipment 2132 installed in WD 2110. For example, if WD 2110 is a smart phone, the interaction may be via a touch screen; if WD 2110 is a smart meter, the interaction may be through a screen that provides usage (e.g., the number of gallons used) or a speaker that provides an audible alert (e.g., if smoke is detected). User interface equipment 2132 may include input interfaces, devices and circuits, and output interfaces, devices and circuits. User interface equipment 2132 is configured to allow input of information into WD 2110, and is connected to processing circuitry 2120 to allow processing circuitry 2120 to process the input information. User interface equipment 2132 may include, for example, a microphone, a proximity or other sensor, keys/buttons, a touch display, one or more cameras, a USB port, or other input circuitry. User interface equipment 2132 is also configured to allow output of information from WD 2110, and to allow processing circuitry 2120 to output information from WD 2110. User interface equipment 2132 may include, for example, a speaker, a display, vibrating circuitry, a USB port, a headphone interface, or other output circuitry. Using one or more input and output interfaces, devices, and circuits, of user interface equipment 2132, WD 2110 may communicate with end users and/or the wireless network, and allow them to benefit from the functionality described herein.

Auxiliary equipment 2134 is operable to provide more specific functionality which may not be generally performed by WDs. This may comprise specialized sensors for doing measurements for various purposes, interfaces for additional types of communication such as wired communications etc. The inclusion and type of components of auxiliary equipment 2134 may vary depending on the embodiment and/or scenario.

Power source 2136 may, in some embodiments, be in the form of a battery or battery pack. Other types of power sources, such as an external power source (e.g., an electricity outlet), photovoltaic devices or power cells, may also be used. WD 2110 may further comprise power circuitry 2137 for delivering power from power source 2136 to the various parts of WD 2110 which need power from power source 2136 to carry out any functionality described or indicated herein. Power circuitry 2137 may in certain embodiments comprise power management circuitry. Power circuitry 2137 may additionally or alternatively be operable to receive power from an external power source; in which case WD 2110 may be connectable to the external power source (such as an electricity outlet) via input circuitry or an interface such as an electrical power cable. Power circuitry 2137 may also in certain embodiments be operable to deliver power from an external power source to power source 2136. This may be, for example, for the charging of power source 2136. Power circuitry 2137 may perform any formatting, converting, or other modification to the power from power source 2136 to make the power suitable for the respective components of WD 2110 to which power is supplied.

Figure 11:
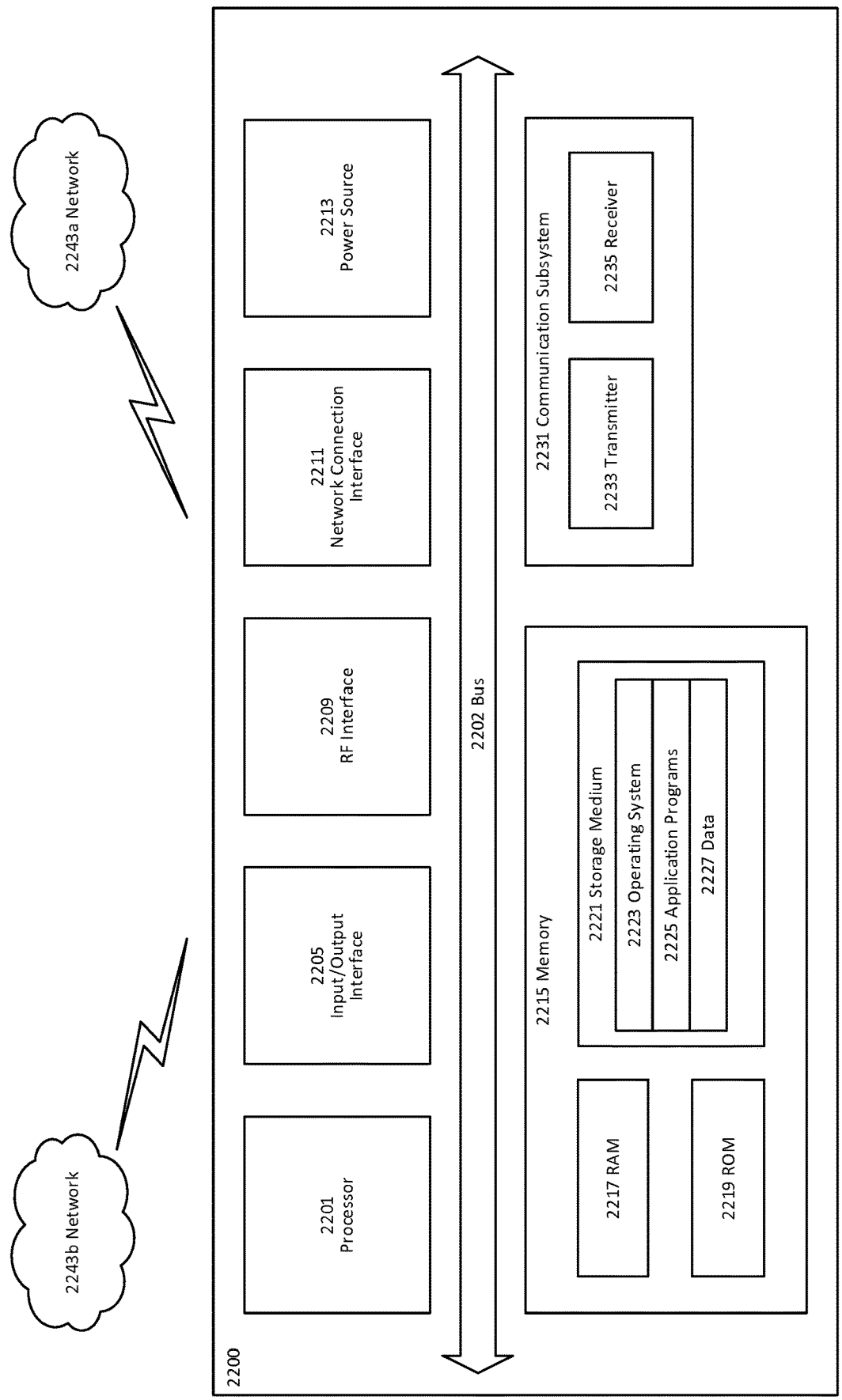
FIG. 11 shows an exemplary UE applicable to the solution presented herein.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the 3rd Generation Partnership Project (3GPP), including a NB-IoT UE, a machine type communication (MTC) UE, and/or an enhanced MTC (eMTC) UE. UE 2200, as illustrated in FIG. 11, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 2200 includes processing circuitry 2201 that is operatively coupled to input/output interface 2205, radio frequency (RF) interface 2209, network connection interface 2211, memory 2215 including random access memory (RAM) 2217, read-only memory (ROM) 2219, and storage medium 2221 or the like, communication subsystem 2231, power source 2233, and/or any other component, or any combination thereof. Storage medium 2221 includes operating system 2223, application program 2225, and data 2227. In other embodiments, storage medium 2221 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 2201 may be configured to process computer instructions and data. Processing circuitry 2201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2201 may include two central processing units (CPUs). Data may be information in a form suitable for use by a computer.

In the depicted embodiment, input/output interface 2205 may be configured to provide a communication interface to an input device, output device, or input and output device. UE 2200 may be configured to use an output device via input/output interface 2205. An output device may use the same type of interface port as an input device. For example, a USB port may be used to provide input to and output from UE 2200. The output device may be a speaker, a sound card, a video card, a display, a monitor, a printer, an actuator, an emitter, a smartcard, another output device, or any combination thereof. UE 2200 may be configured to use an input device via input/output interface 2205 to allow a user to capture information into UE 2200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 2209 may be configured to provide a communication interface to RF components such as a transmitter, a receiver, and an antenna. Network connection interface 2211 may be configured to provide a communication interface to network 2243a. Network 2243a may encompass wired and/or wireless networks such as a local-area network (LAN), a wide-area network (WAN), a computer network, a wireless network, a telecommunications network, another like network or any combination thereof. For example, network 2243a may comprise a Wi-Fi network. Network connection interface 2211 may be configured to include a receiver and a transmitter interface used to communicate with one or more other devices over a communication network according to one or more communication protocols, such as Ethernet, TCP/IP, SONET, ATM, or the like. Network connection interface 2211 may implement receiver and transmitter functionality appropriate to the communication network links (e.g., optical, electrical, and the like). The transmitter and receiver functions may share circuit components, software or firmware, or alternatively may be implemented separately.

RAM 2217 may be configured to interface via bus 2202 to processing circuitry 2201 to provide storage or caching of data or computer instructions during the execution of software programs such as the operating system, application programs, and device drivers. ROM 2219 may be configured to provide computer instructions or data to processing circuitry 2201. For example, ROM 2219 may be configured to store invariant low-level system code or data for basic system functions such as basic input and output (I/O), startup, or reception of keystrokes from a keyboard that are stored in a non-volatile memory. Storage medium 2221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2221 may be configured to include operating system 2223, application program 2225 such as a web browser application, a widget or gadget engine or another application, and data file 2227. Storage medium 2221 may store, for use by UE 2200, any of a variety of various operating systems or combinations of operating systems.

Storage medium 2221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2221 may allow UE 2200 to access computer-executable instructions, application programs or the like, stored on transitory or non-transitory memory media, to off-load data, or to upload data. An article of manufacture, such as one utilizing a communication system may be tangibly embodied in storage medium 2221, which may comprise a device readable medium.

In FIG. 11, processing circuitry 2201 may be configured to communicate with network 2243b using communication subsystem 2231. Network 2243a and network 2243b may be the same network or networks or different network or networks. Communication subsystem 2231 may be configured to include one or more transceivers used to communicate with network 2243b. For example, communication subsystem 2231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 2233 and/or receiver 2235 to implement transmitter or receiver functionality, respectively, appropriate to the RAN links (e.g., frequency allocations and the like). Further, transmitter 2233 and receiver 2235 of each transceiver may share circuit components, software or firmware, or alternatively may be implemented separately.

In the illustrated embodiment, the communication functions of communication subsystem 2231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 2231 may include cellular communication, Wi-Fi communication, Bluetooth communication, and GPS communication. Network 2243b may encompass wired and/or wireless networks such as a local-area network (LAN), a wide-area network (WAN), a computer network, a wireless network, a telecommunications network, another like network or any combination thereof. For example, network 2243b may be a cellular network, a Wi-Fi network, and/or a near-field network. Power source 2213 may be configured to provide alternating current (AC) or direct current (DC) power to components of UE 2200.

The features, benefits and/or functions described herein may be implemented in one of the components of UE 2200 or partitioned across multiple components of UE 2200. Further, the features, benefits, and/or functions described herein may be implemented in any combination of hardware, software or firmware. In one example, communication subsystem 2231 may be configured to include any of the components described herein. Further, processing circuitry 2201 may be configured to communicate with any of such components over bus 2202. In another example, any of such components may be represented by program instructions stored in memory that when executed by processing circuitry 2201 perform the corresponding functions described herein. In another example, the functionality of any of such components may be partitioned between processing circuitry 2201 and communication subsystem 2231. In another example, the non-computationally intensive functions of any of such components may be implemented in software or firmware and the computationally intensive functions may be implemented in hardware.

Figure 12:
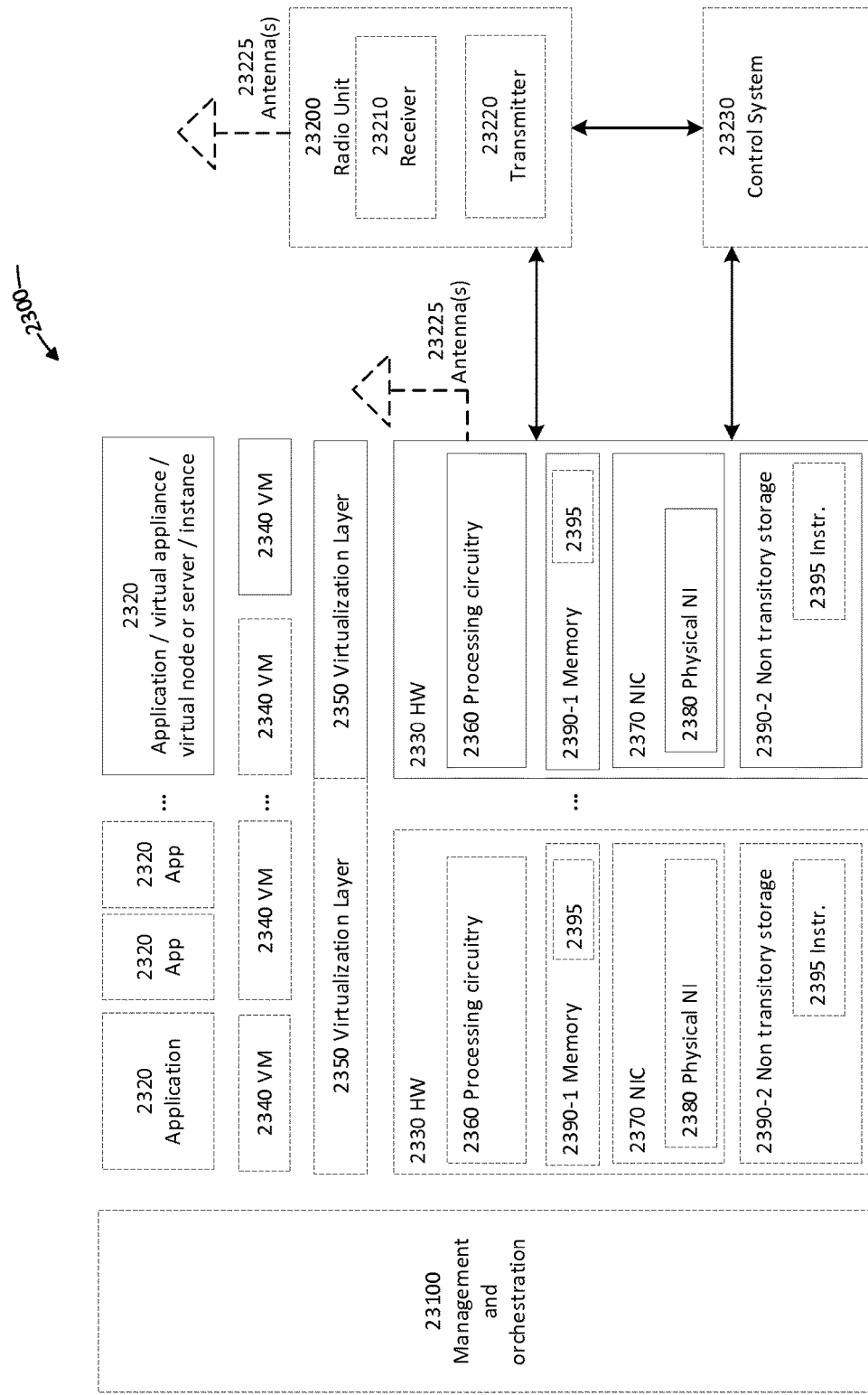
FIG. 12 shows an exemplary virtualization environment applicable to the solution presented herein.

FIG. 12 is a schematic block diagram illustrating a virtualization environment 2300 in which functions implemented by some embodiments may be virtualized. In the present context, virtualizing means creating virtual versions of apparatuses or devices, which may include virtualizing hardware platforms, storage devices, and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2300 hosted by one or more of hardware nodes 2330. Further, in embodiments in which the virtual node is not a radio access node or does not require radio connectivity (e.g., a core network node), then the network node may be entirely virtualized.

The functions may be implemented by one or more applications 2320 (which may alternatively be called software instances, virtual appliances, network functions, virtual nodes, virtual network functions, etc.) operative to implement some of the features, functions, and/or benefits of some of the embodiments disclosed herein. Applications 2320 are run in virtualization environment 2300 which provides hardware 2330 comprising processing circuitry 2360 and memory 2390. Memory 2390 contains instructions 2395 executable by processing circuitry 2360 whereby application 2320 is operative to provide one or more of the features, benefits, and/or functions disclosed herein.

Virtualization environment 2300, comprises general-purpose or special-purpose network hardware devices 2330 comprising a set of one or more processors or processing circuitry 2360, which may be commercial off-the-shelf (COTS) processors, dedicated Application Specific Integrated Circuits (ASICs), or any other type of processing circuitry including digital or analog hardware components or special purpose processors. Each hardware device may comprise memory 2390-1 which may be non-persistent memory for temporarily storing instructions 2395 or software executed by processing circuitry 2360. Each hardware device may comprise one or more network interface controllers (NICs) 2370, also known as network interface cards, which include physical network interface 2380. Each hardware device may also include non-transitory, persistent, machine-readable storage media 2390-2 having stored therein software 2395 and/or instructions executable by processing circuitry 2360. Software 2395 may include any type of software including software for instantiating one or more virtualization layers 2350 (also referred to as hypervisors), software to execute virtual machines 2340 as well as software allowing it to execute functions, features and/or benefits described in relation with some embodiments described herein.

Virtual machines 2340, comprise virtual processing, virtual memory, virtual networking or interface and virtual storage, and may be run by a corresponding virtualization layer 2350 or hypervisor. Different embodiments of the instance of virtual appliance 2320 may be implemented on one or more of virtual machines 2340, and the implementations may be made in different ways.

During operation, processing circuitry 2360 executes software 2395 to instantiate the hypervisor or virtualization layer 2350, which may sometimes be referred to as a virtual machine monitor (VMM). Virtualization layer 2350 may present a virtual operating platform that appears like networking hardware to virtual machine 2340.

As shown in FIG. 12, hardware 2330 may be a standalone network node with generic or specific components. Hardware 2330 may comprise antenna 23225 and may implement some functions via virtualization. Alternatively, hardware 2330 may be part of a larger cluster of hardware (e.g. such as in a data center or customer premise equipment (CPE)) where many hardware nodes work together and are managed via management and orchestration (MANO) 23100, which, among others, oversees lifecycle management of applications 2320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2340 may be a software implementation of a physical machine that runs programs as if they were executing on a physical, non-virtualized machine. Each of virtual machines 2340, and that part of hardware 2330 that executes that virtual machine, be it hardware dedicated to that virtual machine and/or hardware shared by that virtual machine with others of the virtual machines 2340, forms a separate virtual network elements (VNE).

Still in the context of NFV, Virtual Network Function (VNF) is responsible for handling specific network functions that run in one or more virtual machines 2340 on top of hardware networking infrastructure 2330 and corresponds to application 2320 in FIG. 12.

In some embodiments, one or more radio units 23200 that each include one or more transmitters 23220 and one or more receivers 23210 may be coupled to one or more antennas 23225. Radio units 23200 may communicate directly with hardware nodes 2330 via one or more appropriate network interfaces and may be used in combination with the virtual components to provide a virtual node with radio capabilities, such as a radio access node or a base station.

In some embodiments, some signalling can be effected with the use of control system 23230 which may alternatively be used for communication between the hardware nodes 2330 and radio units 23200.

Figure 13:
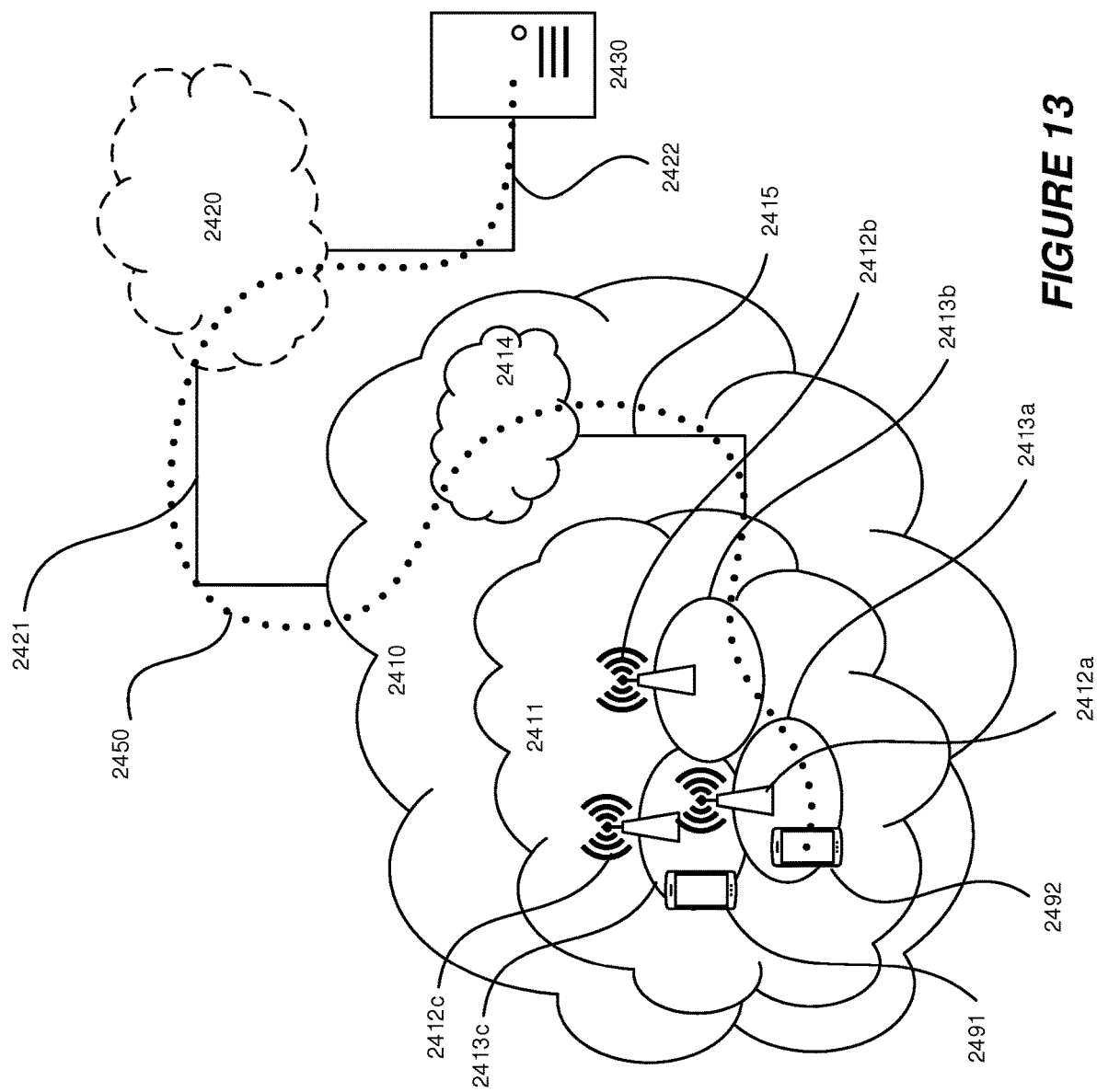
FIG. 13 shows an exemplary telecommunications network applicable to the solution presented herein.

FIG. 13 illustrates a telecommunication network connected via an intermediate network to a host computer in accordance with some embodiments. In particular, with reference to FIG. 13, in accordance with an embodiment, a communication system includes telecommunication network 2410, such as a 3GPP-type cellular network, which comprises access network 2411, such as a radio access network, and core network 2414. Access network 2411 comprises a plurality of base stations 2412a, 2412b, 2412c, such as NBs, eNBs, gNBs or other types of wireless access points, each defining a corresponding coverage area 2413a, 2413b, 2413c. Each base station 2412a, 2412b, 2412c is connectable to core network 2414 over a wired or wireless connection 2415. A first UE 2491 located in coverage area 2413c is configured to wirelessly connect to, or be paged by, the corresponding base station 2412c. A second UE 2492 in coverage area 2413a is wirelessly connectable to the corresponding base station 2412a. While a plurality of UEs 2491, 2492 are illustrated in this example, the disclosed embodiments are equally applicable to a situation where a sole UE is in the coverage area or where a sole UE is connecting to the corresponding base station 2412.

Telecommunication network 2410 is itself connected to host computer 2430, which may be embodied in the hardware and/or software of a standalone server, a cloud-implemented server, a distributed server, or as processing resources in a server farm. Host computer 2430 may be under the ownership or control of a service provider, or may be operated by the service provider or on behalf of the service provider. Connections 2421 and 2422 between telecommunication network 2410 and host computer 2430 may extend directly from core network 2414 to host computer 2430 or may go via an optional intermediate network 2420. Intermediate network 2420 may be one of, or a combination of more than one of, a public, private or hosted network; intermediate network 2420, if any, may be a backbone network or the Internet; in particular, intermediate network 2420 may comprise two or more sub-networks (not shown).

The communication system of FIG. 13 as a whole enables connectivity between the connected UEs 2491, 2492 and host computer 2430. The connectivity may be described as an over-the-top (OTT) connection 2450. Host computer 2430 and the connected UEs 2491, 2492 are configured to communicate data and/or signaling via OTT connection 2450, using access network 2411, core network 2414, any intermediate network 2420 and possible further infrastructure (not shown) as intermediaries. OTT connection 2450 may be transparent in the sense that the participating communication devices through which OTT connection 2450 passes are unaware of routing of uplink and downlink communications. For example, base station 2412 may not or need not be informed about the past routing of an incoming downlink communication with data originating from host computer 2430 to be forwarded (e.g., handed over) to a connected UE 2491. Similarly, base station 2412 need not be aware of the future routing of an outgoing uplink communication originating from the UE 2491 towards the host computer 2430.

Figure 14:
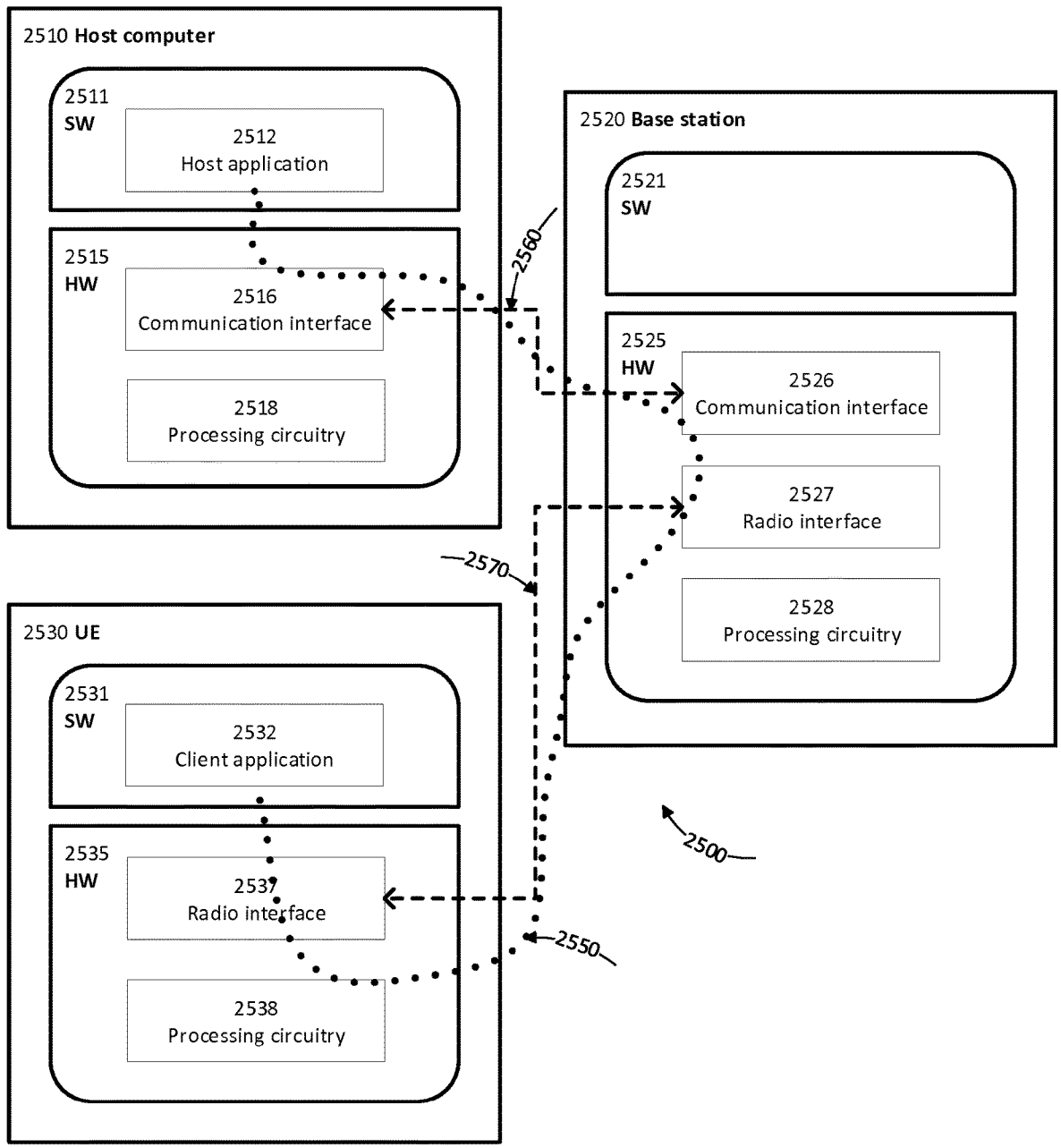
FIG. 14 shows an exemplary host computer applicable to the solution presented herein.

Example implementations, in accordance with an embodiment, of the UE, base station and host computer discussed in the preceding paragraphs will now be described with reference to FIG. 14. FIG. 14 illustrates host computer communicating via a base station with a user equipment over a partially wireless connection in accordance with some embodiments In communication system 2500, host computer 2510 comprises hardware 2515 including communication interface 2516 configured to set up and maintain a wired or wireless connection with an interface of a different communication device of communication system 2500. Host computer 2510 further comprises processing circuitry 2518, which may have storage and/or processing capabilities. In particular, processing circuitry 2518 may comprise one or more programmable processors, application-specific integrated circuits, field programmable gate arrays or combinations of these (not shown) adapted to execute instructions. Host computer 2510 further comprises software 2511, which is stored in or accessible by host computer 2510 and executable by processing circuitry 2518. Software 2511 includes host application 2512. Host application 2512 may be operable to provide a service to a remote user, such as UE 2530 connecting via OTT connection 2550 terminating at UE 2530 and host computer 2510. In providing the service to the remote user, host application 2512 may provide user data which is transmitted using OTT connection 2550.

Communication system 2500 further includes base station 2520 provided in a telecommunication system and comprising hardware 2525 enabling it to communicate with host computer 2510 and with UE 2530. Hardware 2525 may include communication interface 2526 for setting up and maintaining a wired or wireless connection with an interface of a different communication device of communication system 2500, as well as radio interface 2527 for setting up and maintaining at least wireless connection 2570 with UE 2530 located in a coverage area (not shown in FIG. 14) served by base station 2520. Communication interface 2526 may be configured to facilitate connection 2560 to host computer 2510. Connection 2560 may be direct or it may pass through a core network (not shown in FIG. 14) of the telecommunication system and/or through one or more intermediate networks outside the telecommunication system. In the embodiment shown, hardware 2525 of base station 2520 further includes processing circuitry 2528, which may comprise one or more programmable processors, application-specific integrated circuits, field programmable gate arrays or combinations of these (not shown) adapted to execute instructions. Base station 2520 further has software 2521 stored internally or accessible via an external connection.

Communication system 2500 further includes UE 2530 already referred to. Its hardware 2535 may include radio interface 2537 configured to set up and maintain wireless connection 2570 with a base station serving a coverage area in which UE 2530 is currently located. Hardware 2535 of UE 2530 further includes processing circuitry 2538, which may comprise one or more programmable processors, application-specific integrated circuits, field programmable gate arrays or combinations of these (not shown) adapted to execute instructions. UE 2530 further comprises software 2531, which is stored in or accessible by UE 2530 and executable by processing circuitry 2538. Software 2531 includes client application 2532. Client application 2532 may be operable to provide a service to a human or non-human user via UE 2530, with the support of host computer 2510. In host computer 2510, an executing host application 2512 may communicate with the executing client application 2532 via OTT connection 2550 terminating at UE 2530 and host computer 2510. In providing the service to the user, client application 2532 may receive request data from host application 2512 and provide user data in response to the request data. OTT connection 2550 may transfer both the request data and the user data. Client application 2532 may interact with the user to generate the user data that it provides.

It is noted that host computer 2510, base station 2520 and UE 2530 illustrated in FIG. 14 may be similar or identical to host computer 2430, one of base stations 2412a, 2412b, 2412c and one of UEs 2491, 2492 of FIG. 13, respectively. This is to say, the inner workings of these entities may be as shown in FIG. 14 and independently, the surrounding network topology may be that of FIG. 13.

In FIG. 14, OTT connection 2550 has been drawn abstractly to illustrate the communication between host computer 2510 and UE 2530 via base station 2520, without explicit reference to any intermediary devices and the precise routing of messages via these devices. Network infrastructure may determine the routing, which it may be configured to hide from UE 2530 or from the service provider operating host computer 2510, or both. While OTT connection 2550 is active, the network infrastructure may further take decisions by which it dynamically changes the routing (e.g., on the basis of load balancing consideration or reconfiguration of the network).

Wireless connection 2570 between UE 2530 and base station 2520 is in accordance with the teachings of the embodiments described throughout this disclosure. One or more of the various embodiments improve the performance of OTT services provided to UE 2530 using OTT connection 2550, in which wireless connection 2570 forms the last segment.

A measurement procedure may be provided for the purpose of monitoring data rate, latency and other factors on which the one or more embodiments improve. There may further be an optional network functionality for reconfiguring OTT connection 2550 between host computer 2510 and UE 2530, in response to variations in the measurement results. The measurement procedure and/or the network functionality for reconfiguring OTT connection 2550 may be implemented in software 2511 and hardware 2515 of host computer 2510 or in software 2531 and hardware 2535 of UE 2530, or both. In embodiments, sensors (not shown) may be deployed in or in association with communication devices through which OTT connection 2550 passes; the sensors may participate in the measurement procedure by supplying values of the monitored quantities exemplified above, or by supplying values of other physical quantities from which software 2511, 2531 may compute or estimate the monitored quantities. The reconfiguring of OTT connection 2550 may include message format, retransmission settings, preferred routing etc.; the reconfiguring need not affect base station 2520, and it may be unknown or imperceptible to base station 2520. Such procedures and functionalities may be known and practiced in the art. In certain embodiments, measurements may involve proprietary UE signaling facilitating host computer 2510's measurements of throughput, propagation times, latency and the like. The measurements may be implemented in that software 2511 and 2531 causes messages to be transmitted, in particular empty or 'dummy' messages, using OTT connection 2550 while it monitors propagation times, errors etc.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 2610, the host computer provides user data. In substep 2611 (which may be optional) of step 2610, the host computer provides the user data by executing a host application. In step 2620, the host computer initiates a transmission carrying the user data to the UE. In step 2630 (which may be optional), the base station transmits to the UE the user data which was carried in the transmission that the host computer initiated, in accordance with the teachings of the embodiments described throughout this disclosure. In step 2640 (which may also be optional), the UE executes a client application associated with the host application executed by the host computer.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 2710 of the method, the host computer provides user data. In an optional substep (not shown) the host computer provides the user data by executing a host application. In step 2720, the host computer initiates a transmission carrying the user data to the UE. The transmission may pass via the base station, in accordance with the teachings of the embodiments described throughout this disclosure. In step 2730 (which may be optional), the UE receives the user data carried in the transmission.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 2810 (which may be optional), the UE receives input data provided by the host computer. Additionally or alternatively, in step 2820, the UE provides user data. In substep 2821 (which may be optional) of step 2820, the UE provides the user data by executing a client application. In substep 2811 (which may be optional) of step 2810, the UE executes a client application which provides the user data in reaction to the received input data provided by the host computer. In providing the user data, the executed client application may further consider user input received from the user. Regardless of the specific manner in which the user data was provided, the UE initiates, in substep 2830 (which may be optional), transmission of the user data to the host computer. In step 2840 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 2910 (which may be optional), in accordance with the teachings of the embodiments described throughout this disclosure, the base station receives user data from the UE. In step 2920 (which may be optional), the base station initiates transmission of the received user data to the host computer. In step 2930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The following details further embodiments including, but not limited to those enumerated below.

D1. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the base station steps disclosed herein.

D2. The communication system of the pervious embodiment further including the base station.

D3. The communication system of the previous 2 embodiments, further including the UE, wherein the UE is configured to communicate with the base station.

D4. The communication system of the previous 3 embodiments, wherein:
the processing circuitry of the host computer is configured to execute a host application, thereby providing the user data; and
the UE comprises processing circuitry configured to execute a client application associated with the host application.

D5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the base station steps disclosed herein.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the UE steps disclosed herein.

D10. The communication system of the previous embodiment, wherein the cellular network further includes a base station configured to communicate with the UE.

D11. The communication system of the previous 2 embodiments, wherein:
the processing circuitry of the host computer is configured to execute a host application, thereby providing the user data; and
the UE's processing circuitry is configured to execute a client application associated with the host application.

D12. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the UE steps disclosed herein.

D13. The method of the previous embodiment, further comprising at the UE, receiving the user data from the base station.

D14. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the UE steps disclosed herein.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:
the processing circuitry of the host computer is configured to execute a host application; and
the UE's processing circuitry is configured to execute a client application associated with the host application, thereby providing the user data.

D18. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

D19. A method implemented in a communication system including a host computer, a base station and a user equipment (UE), the method comprising:
at the host computer, receiving user data transmitted to the base station from the UE, wherein the UE performs any of the steps of any of the UE steps disclosed herein.

D20. The method of the previous embodiment, further comprising, at the UE, providing the user data to the base station.

D21. The method of the previous 2 embodiments, further comprising:
at the UE, executing a client application, thereby providing the user data to be transmitted; and
at the host computer, executing a host application associated with the client application.

D22. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the base station steps disclosed herein.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:
the processing circuitry of the host computer is configured to execute a host application;
the UE is configured to execute a client application associated with the host application, thereby providing the user data to be received by the host computer.

D27. A method implemented in a communication system including a host computer, a base station and a user equipment (UE), the method comprising:
at the host computer, receiving, from the base station, user data originating from a transmission which the base station has received from the UE, wherein the UE performs any of the steps of any of the UE steps disclosed herein.

D28. The method of the previous embodiment, further comprising at the base station, receiving the user data from the UE.

D29. The method of the previous 2 embodiments, further comprising at the base station, initiating a transmission of the received user data to the host computer.

The solution presented herein may, of course, be carried out in other ways than those specifically set forth herein without departing from essential characteristics of the disclosed solution. The present embodiments are to be considered in all respects as illustrative and not restrictive, and all changes coming within the meaning and equivalency range of the appended claims are intended to be embraced therein.

The invention claimed is:

1. A method performed by a wireless device for receiving signals transmitted to the wireless device by a network node, the method comprising:
receiving a first signal using at least one receiver configured according to a first transmission parameter defining first time and/or frequency resources for monitoring a downlink control channel scheduling for downlink control information included in the first signal, the first signal comprising:
one or more second transmission parameters, each different from the first transmission parameter, the one or more second transmission parameters each defining different second time and/or frequency resources for monitoring the downlink control channel scheduling for the downlink control channel included in one or more second signals; and
a configuration indication indicating a selection, by the network node, of the first transmission parameter or the one or more second transmission parameters for each of the one or more second signals;
configuring at least one receiver in the wireless device for receiving each of the one or more second signals according to the first transmission parameter or the one or more second transmission parameters responsive to the configuration indication; and
receiving the one or more second signals using the at least one receiver configured responsive to the configuration indication.

2. The method of claim 1 wherein:
the first transmission parameter comprises a first control resource set (CORESET) configuration; and
at least one of the one or more second transmission parameters comprises a second CORESET configuration, different from the first CORESET configuration.

3. The method of claim 1 wherein:
the first transmission parameter comprises a first search space configuration; and
at least one of the one or more second transmission parameters comprises a second search space configuration, different from the first search space configuration.

4. The method of claim 1 wherein the configuration indication comprises a configuration flag set comprising one or more bits representing the selected transmission parameter for each of the one or more second signals.

5. The method of claim 4 wherein the configuration flag set comprises a single bit indicative of a selection of the first transmission parameter or the one or more second transmission parameters for all of the one or more second signals.

6. The method of claim 4 wherein each bit position of the configuration flag set corresponds to a different one of the one or more second signals.

7. The method of claim 4 wherein the one or more bits of the configuration flag set define a plurality of values indicative of the selected transmission parameter for each of the one or more second signals.

8. The method of claim 1 wherein the configuration indication comprises an implicit configuration indication.

9. The method of claim 8 wherein the implicit configuration indication comprises the omission of an explicit flag or bit to indicate the selection of the first transmission parameter for each of the one or more second signals.

10. The method of claim 1 wherein the downlink control information included in the first signal comprises Remaining Minimum System Information (RMSI).

11. The method of claim 1 wherein the downlink control information included in the second signal comprises:
paging information; and/or
Other System Information (OSI); and/or
Random Access Response (RAR) information.

12. The method of claim 1 wherein the one or more second transmission parameters comprises a different second transmission parameter for each of the one or more second signals.

13. The method of claim 1 wherein the one or more second transmission parameters comprises one second transmission parameter for some of the one or more second signals and another different second transmission parameter for some or all of the remaining one or more second signals.

14. A wireless device configured to receive signals from a network node, the wireless device comprising one or more processing circuits configured to:
receive a first signal using at least one receiver configured according to a first transmission parameter defining first time and/or frequency resources for monitoring a downlink control channel scheduling for downlink control information included in the first signal, the first signal comprising:
one or more second transmission parameters, each different from the first transmission parameter, the one or more second transmission parameters each defining different second time and/or frequency resources for monitoring the downlink control channel scheduling for the downlink control channel included in one or more second signals; and
a configuration indication indicating a selection, by the network node, of the first transmission parameter or the one or more second transmission parameters for each of the one or more second signals;
configure at least one receiver in the wireless device for receiving each of the one or more second signals according to the first transmission parameter or the one or more second transmission parameters responsive to the configuration indication; and
receive the one or more second signals using the at least one receiver configured responsive to the configuration indication.

15. A method performed by a network node for signal transmission to a wireless device, the method comprising:
determining a first transmission parameter defining first time and/or frequency resources for transmission of downlink control channel scheduling downlink control information in a first signal;
selecting, for each of one or more second signals, the first transmission parameter or one or more second transmission parameters, each different from the first transmission parameter, the one or more second transmission parameters defining different second time and/or frequency resources for transmission of the downlink control channel scheduling the downlink control information in the one or more second signals;
transmitting the first signal to the wireless device according to the first transmission parameter, the first signal comprising:
the one or more second transmission parameters; and
a configuration indication indicating the selected transmission parameter for each of the one or more second signals; and
transmitting the one or more second signals to the wireless device according to the corresponding selected transmission parameter.

16. The method of claim 15 wherein:
the first transmission parameter comprises a first control resource set (CORESET) configuration; and
at least one of the one or more second transmission parameters comprises a second CORESET configuration, different from the first CORESET configuration.

17. The method of claim 15 wherein:
the first transmission parameter comprises a first search space configuration; and
at least one of the one or more second transmission parameters comprises a second search space configuration, different from the first search space configuration.

18. The method of claim 15 wherein the configuration indication comprises a configuration flag set comprising one or more bits representing the selected transmission parameter for each of the one or more second signals.

19. The method of claim 18 wherein the configuration flag set comprise a single bit, the method further comprising:
setting the single bit of the configuration flag set to a first value indicative of the network node selecting the first transmission parameter for all of the one or more second signals; and
setting the single bit of the configuration flag set to a second value different from the first value, the second value indicative of the network node selecting the one or more second transmission parameters for all of the one or more second signals.

20. The method of claim 18 wherein each bit position of the configuration flag set corresponds to a different one of the one or more second signals.

21. The method of claim 18 wherein the one or more bits of the configuration flag set define a plurality of values indicative of the selected transmission parameter for each of the one or more second signals.

22. The method of claim 15 wherein the configuration indication comprises an implicit configuration indication.

23. The method of claim 22 wherein the implicit configuration indication comprises the omission of an explicit flag or bit to indicate the selection of the first transmission parameter for each of the one or more second signals.

24. The method of claim 15 wherein the downlink control information included in the first signal comprises Remaining Minimum System Information (RMSI).

25. The method of claim 15 wherein the downlink control information included in the second signal comprises:
paging information; and/or
Other System Information (OSI); and/or
Random Access Response (RAR) information.

26. The method of claim 15 wherein the one or more second transmission parameters comprises a different second transmission parameter for each of the one or more second signals.

27. The method of claim 15 wherein the one or more second transmission parameters comprises one second transmission parameter for some of the one or more second signals and another different second transmission parameter for some or all of the remaining one or more second signals.

28. The method of claim 15 wherein said selecting comprises selecting, for each of the one or more second signals, the one or more second transmission parameters responsive to:
one or more deployment parameters; and/or
a current network load; and/or
an average number of wireless devices to be paged.

29. A network node configured to transmit signals to a wireless device, the network node comprising one or more processing circuits configured to:
determine a first transmission parameter defining first time and/or frequency resources for transmission of downlink control channel scheduling downlink control information in a first signal;

select, for each of one or more second signals, the first transmission parameter or one or more second transmission parameters, each different from the first transmission parameter, the one or more second transmission parameters defining different second time and/or frequency resources for transmission of the downlink control channel scheduling the downlink control information in the one or more second signals;

transmit the first signal to the wireless device according to the first transmission parameter, the first signal comprising:
  the one or more second transmission parameters; and
  a configuration indication indicating the selected transmission parameter for each of the one or more second signals; and transmit the one or more second signals to the wireless device according to the corresponding selected transmission parameter.

* * * * *